United States Patent
Tsujishita et al.

(10) Patent No.: US 7,551,743 B1
(45) Date of Patent: Jun. 23, 2009

(54) NOISE REDUCTION APPARATUS AND AUDIO OUTPUT APPARATUS

(75) Inventors: Masahiro Tsujishita, Tokyo (JP); Masayuki Tsuji, Tokyo (JP); Kenichi Taura, Tokyo (JP); Masayuki Ishida, Tokyo (JP); Eizi Asano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1065 days.

(21) Appl. No.: 09/617,086

(22) Filed: Jul. 14, 2000

(30) Foreign Application Priority Data

Jul. 15, 1999 (JP) .............................. 11-201245
Jul. 15, 1999 (JP) .............................. 11-201246

(51) Int. Cl.
*H04B 15/00* (2006.01)

(52) U.S. Cl. ............................ 381/94.1; 381/2
(58) Field of Classification Search ................. 381/1–4, 381/94.1–94.3, 6–7, 13–16, 57, 123, 94.7, 381/81; 455/296–297, 305, 308–309, 65, 455/309.65; 375/346, 349, 340
See application file for complete search history.

(56) References Cited

U.S. PATENT DOCUMENTS

| | | | | |
|---|---|---|---|---|
| 4,416,024 A | * | 11/1983 | Ugari et al. ................. 455/303 |
| 4,574,390 A | * | 3/1986 | Hirohashi et al. ............. 381/13 |
| 4,727,580 A | * | 2/1988 | Sakai ............................. 381/7 |
| 5,134,719 A | * | 7/1992 | Mankovitz ............... 455/154.1 |
| 5,363,413 A | * | 11/1994 | Vos ............................. 375/340 |
| 5,432,854 A | * | 7/1995 | Honjo et al. .................. 381/10 |
| 5,630,217 A | * | 5/1997 | Matsumoto ................. 455/222 |
| 5,715,351 A | * | 2/1998 | Tanaka ......................... 386/44 |
| 5,812,673 A | * | 9/1998 | Nohara et al. ................. 381/13 |
| 5,982,901 A | * | 11/1999 | Kane et al. .................... 381/13 |
| 6,233,443 B1 | * | 5/2001 | Brommer .................... 455/296 |
| 6,690,805 B1 | * | 2/2004 | Tsuji et al. ................. 381/94.1 |

FOREIGN PATENT DOCUMENTS

| | | | |
|---|---|---|---|
| EP | 0477462 | * | 3/1991 |
| EP | 0 629 054 A2 | | 12/1994 |
| EP | 0963086 | * | 1/1999 |
| JP | 59-182641 | | 10/1984 |
| JP | 6387026 | | 4/1988 |
| JP | 01-227529 | | 9/1989 |
| JP | 11-186924 | * | 7/1999 |

* cited by examiner

*Primary Examiner*—Vivian Chin
*Assistant Examiner*—Lun-See Lao
(74) *Attorney, Agent, or Firm*—Birch, Stewart, Kolasch & Birch, LLP

(57) ABSTRACT

The FM broadcast is received and the FM demodulated FM composite signal is stereo demodulated, and when the high band components of the demodulated signal are few, the correction is conducted by using the signals just before and just after the noise generation period, and when the high band components are large, the interpolation is conducted by using a central value calculated from the value of a predetermined period before the noise generation period, and a central value calculated from the value of a predetermined period after the noise generation period.

20 Claims, 18 Drawing Sheets

STRUCTURE OF LEVEL DETECTION MEANS

STRUCTURE OF HIGH BAND LEVEL DETECTION MEANS

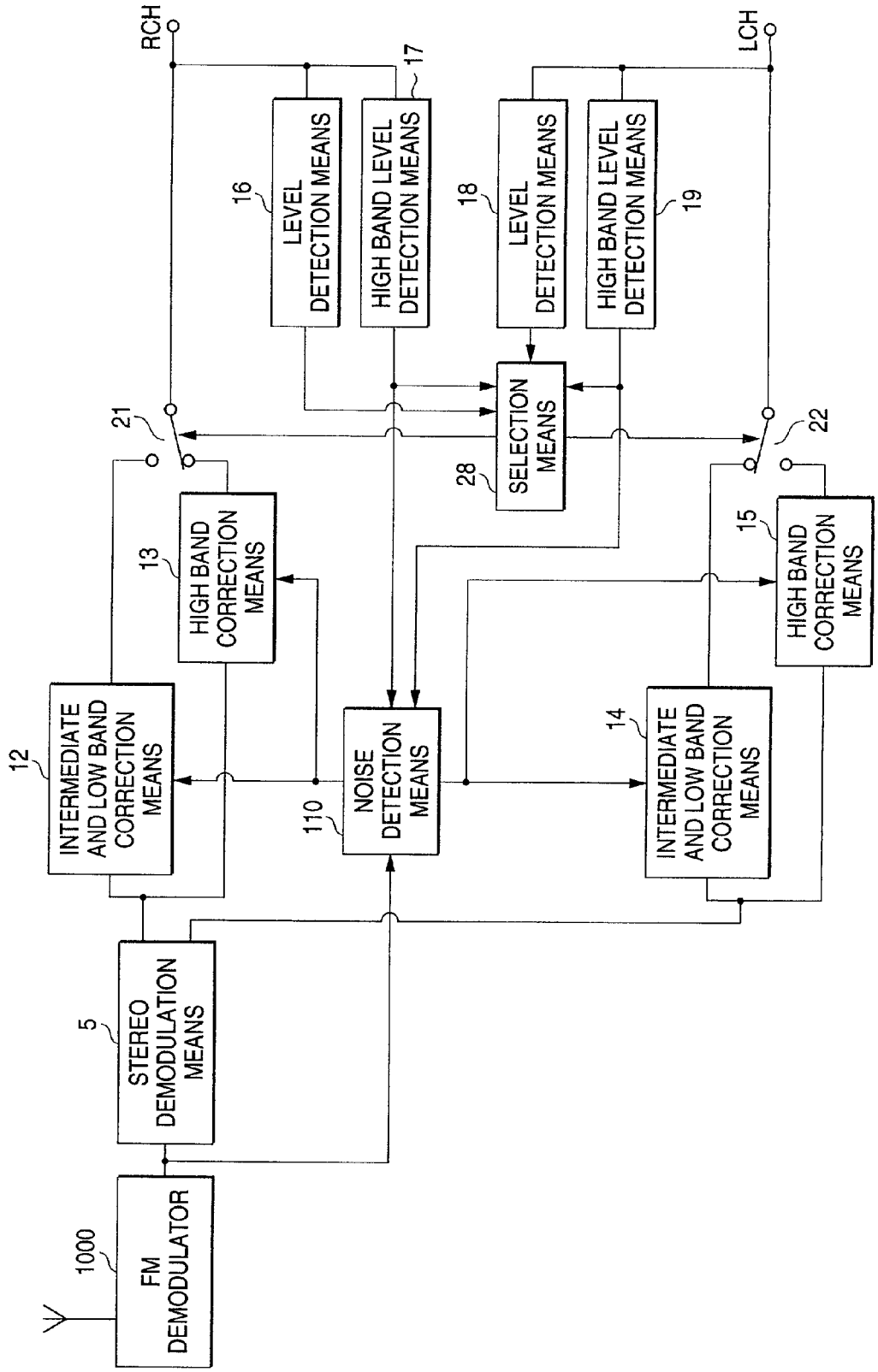

WAVEFORM BEFORE CORRECTION

WAVEFORM AFTER CORRECTION

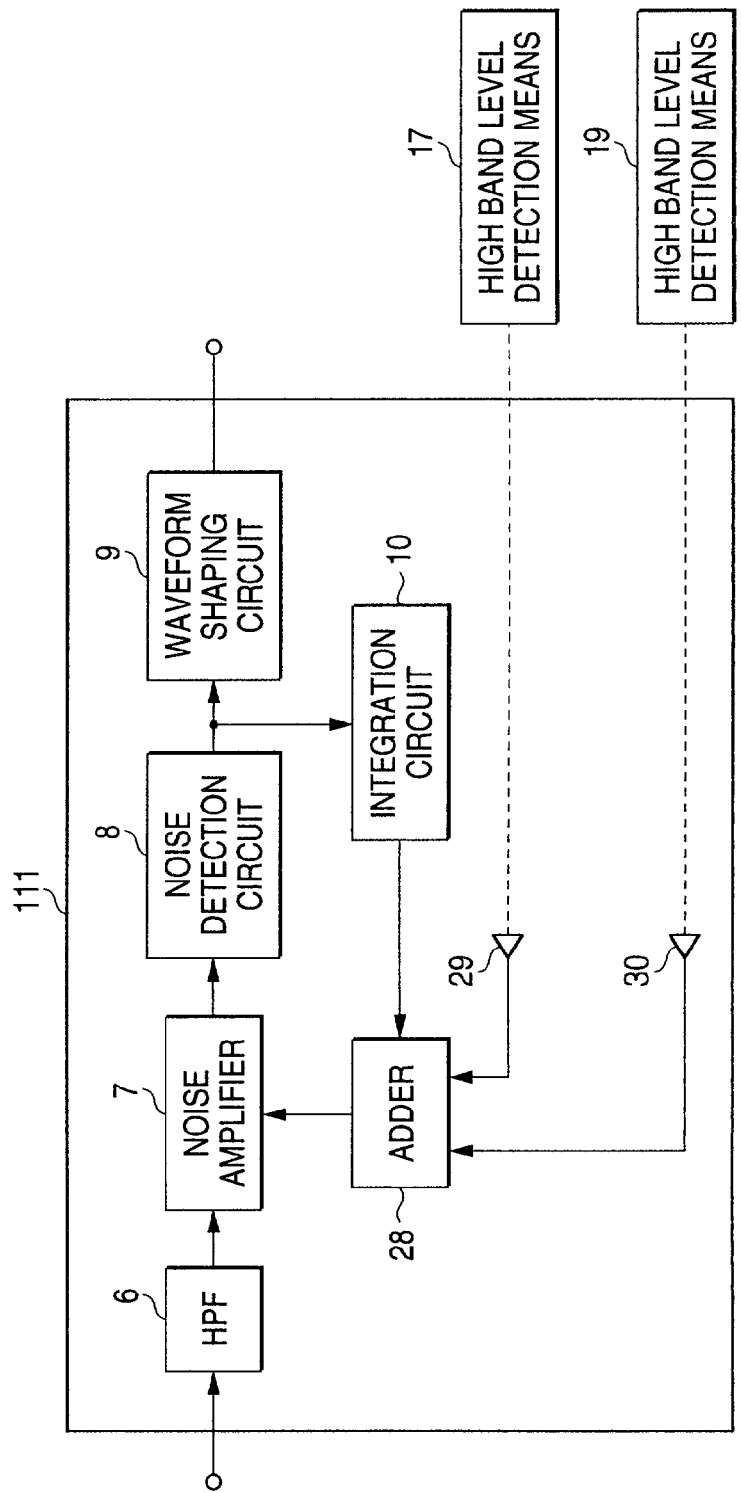

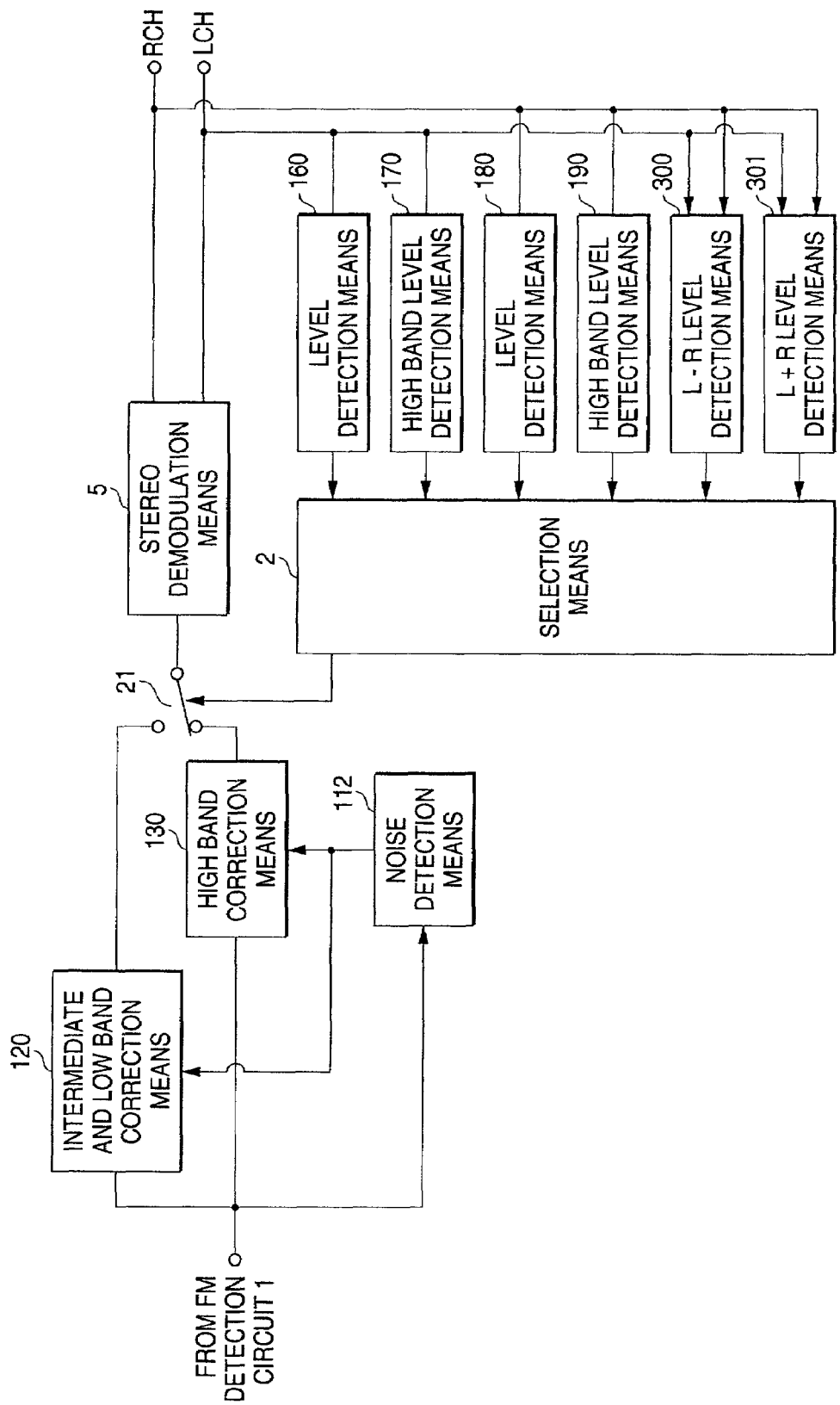

WHEN LOW FREQUENCY IS CORRECTED TO THE CORRECTION PERIOD

WHEN HIGH FREQUENCY IS CORRECTED TO THE CORRECTION PERIOD

FIG. 13A  FM DEMODULATION SIGNAL IN WHICH PULSIVE NOISE IS GENERATED

FIG. 13B  RCH OF STEREO DEMODULATION SIGNAL IN WHICH PULSIVE NOISE IS GENERATED

FIG. 13C  LCH OF STEREO DEMODULATION SIGNAL IN WHICH PULSIVE NOISE IS GENERATED

D0: DENSITY OF DETECTION PULSE
D1: DESIRED VALUE OF DENSITY

STEREO DEMODULATION

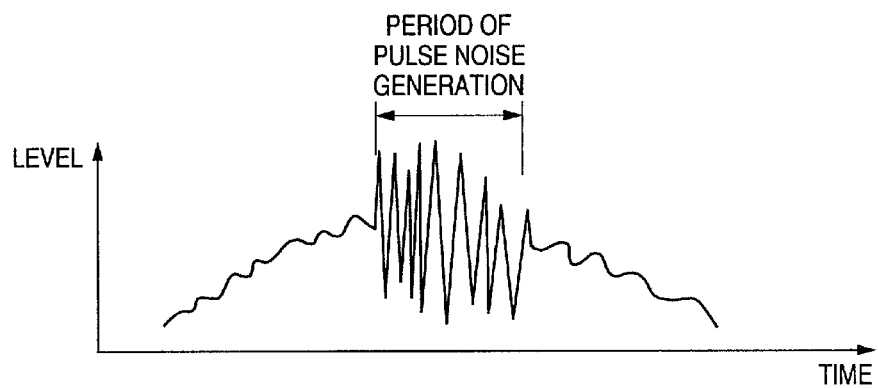
FIG. 20A  INPUT SIGNAL OF HIGH BAND CORRECTION MEANS
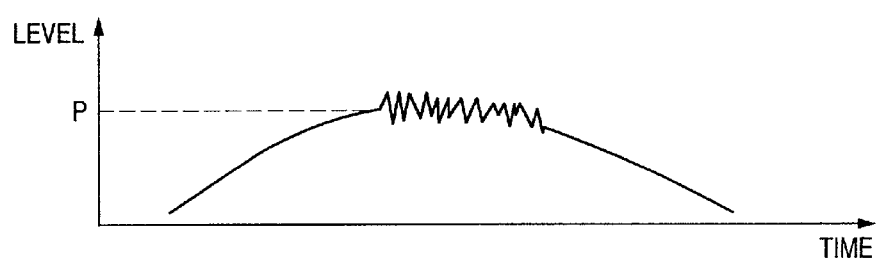
FIG. 20B  OUTPUT SIGNAL OF LPF
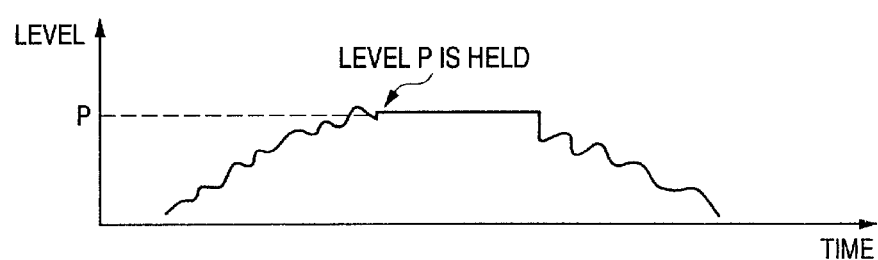
FIG. 20C  OUTPUT SIGNAL OF HIGH BAND CORRECTION MEANS

NOISE REDUCTION APPARATUS AND AUDIO OUTPUT APPARATUS

BACKGROUND OF THE INVENTION

The present invention relates to a noise reduction apparatus at the time of an audio signal receiving, and more specifically to a noise reduction apparatus used for, for example, a car radio in which a pulsive noise is easily mixed, and to an audio output apparatus.

For example, when the electromagnetic noise in the circumstance of the car is considered, various pulsive electromagnetic noises (sometimes called the pulsive noise) such as an ignition noise, or mirror noise, are generated. Because these pulsive noises mix into a reception antenna connected to a car radio inside the car, it is ordinarily often experienced that the pulsive noise is generated in an output audio signal, therefore, generally for the car radio, the noise reduction apparatus to remove the pulsive noise is used.

FIG. 8 is a block diagram of the conventional (pulsive) noise reduction apparatus disclosed in, for example, JP-A-63-87026. In the drawing, when an FM intermediate frequency signal of an FM receiver is inputted, a detection signal outputted from an FM detection circuit 1 is supplied to a delay circuit 2 composed of a LPF (low pass filter) and delayed, and the output of the delay circuit 2 is supplied to a stereo demodulation circuit 5 through a gate circuit 3, and a level hold circuit 4. Further, the detection signal is supplied to a HPF (high pass filter) 6, and a noise component signal passed through the HPF 6 is amplified by a noise amplifier 7, and supplied to a noise detection circuit 8.

The noise detection circuit 8 is composed of a rectifier circuit to rectify the output signal of the noise amplifier 7, and a noise detection output is obtained thereby. This noise detection output is supplied to a waveform shaping circuit 9 and an integration circuit 10. Incidentally, a noise detection means 11 is structured by including the HPF 6, noise amplifier 7, noise detection circuit 8, waveform shaping circuit 9 and integration circuit 10.

The waveform shaping circuit 9 transforms the noise detection output into a pulse having a pulse width of a predetermined time period width, and supplied to the gate circuit 3. The gate circuit 3 is driven by a pulse supplied from the waveform shaping circuit 9 to the gate circuit 3 and comes to a signal cut out condition, and at the time of the signal cut out condition, a delay output level before the signal cut out is held by the level hold circuit 4, and supplied to the stereo demodulation circuit 5.

According to this, the generation of a spike noise by the sudden change of the potential of the demodulation signal due to the pulsive noise is prevented. When the pulse is not supplied from the waveform shaping circuit 9, the gate circuit 3 and the level hold circuit 4 become the signal through condition (through).

Further, the integration circuit 10 smoothes the noise detection output and obtains a DC signal corresponding to the noise level, and supplies the output of the integration circuit 10 to the noise amplifier 7 (feedback), and thereby, an AGC loop is formed.

Incidentally, the delay circuit 2 is provided to make up for a time period from the time when the pulsive noise is supplied to the HPF 6 to the time when the gate circuit 3 is made to be in the cut out condition. Further, because, in the stereo demodulation circuit 5, as shown in FIG. 9, the Lch (left channel) signal and Rch (right channel) signal are inputted in the form which is balancedly modulated with the frequency of 38 kHz around (Lch+Rch)/2, the LCh signal and the Rch signal can be separately picked out by the time division with, for example, 38 kHz.

Further, there is also a method by which the signal is corrected by an average value from the levels before and after the pulsive noise is generated, other than a method by which the former signal is level-held and outputted, as described above. Incidentally, in this method, the following problem exists.

In FIG. 10A, a waveform in the case where a correction error in which a low frequency signal is corrected to a correction period, becomes maximum, is shown. In the drawing, ○ mark is a value in which ● mark is corrected, and the difference between ○ mark and ● mark shows the correction error.

Next, in FIG. 10B, a waveform when a high frequency signal is corrected to a correction period, is shown. In the drawing, ○ mark shows a value in which ● mark is corrected. In the same manner as in FIG. 10A, the difference between ○ mark and ● mark shows the correction error.

Herein, when each of correction errors is observed, FIG. 10B is larger. That is, it is found that the relative relationship of the time width of the frequency to the correction period is very important, and even when a signal of a high frequency component is corrected, the error is large. Accordingly, even when the correction is conducted on the signal of the high frequency component, the correction error is heard as a noise. Herein, in contrast to that the pulse width of the pulsive noise is several tens μs to several hundreds μs, a composite signal has, as shown in FIG. 9, a component which is balancedly modulated with 38 kHz, and because the period of the signal is shorter than that of the pulsive noise, the correction error as shown in FIG. 10B, is generated.

A case where the pulsive noise is generated in a time period of ta of the demodulated signal in the FM demodulator 1, is shown in FIG. 19A. A value of A in FIG. 19A is held in a period of ta in the level hold circuit 4.

A Lch waveform obtained by the stereo demodulation of this corrected signal is shown in FIG. 19B, and a Rch waveform is shown in FIG. 19C.

In this case, as shown in FIG. 19B, because the Lch is held at the level of the Lch, the Lch after the stereo demodulation can be exactly corrected, however, the Rch is, as shown in FIG. 19C, held at the level of the Lch, when the difference between the Rch and Lch is large, the large correction noise as shown in FIG. 19C, is generated.

SUMMARY OF THE INVENTION

In view of this point, the object of the present invention is to obtain a noise reduction apparatus by which the correction error can be reduced even for the signal in which many high frequency components are included, and the noise suppression ability is increased.

A noise reduction apparatus according to the first aspect of the present invention is provided with: a noise detection means for detecting a noise included in a demodulated audio signal; the first correction means for outputting a correction signal for correcting the noise according to a signal value existing just before and just after a predetermined period including a generation time point of the noise in the demodulated audio signal which is detected by the noise detection means; the second correction means for outputting the correction signal for correcting the noise according to a plurality of signal values respectively existing before and after the predetermined period including the generation time point of the noise in the demodulated audio signal which is detected by the noise detection means; a high band level detection means for detecting the level of a high band component of the audio signal; and a selection means for selecting either one of the first or the second correction means according to the output of the high band level detection means.

The noise reduction apparatus according to the second aspect of the present invention is structured such that the first correction means outputs a low pass filter output of a signal value obtained from a linear interpolation of 2 signal values existing just before and just after a predetermined period including a generation time point of the noise, as a correction signal.

The noise reduction apparatus according to the third aspect of the present invention is structured such that the second correction means outputs a low pass filter output of the signal value obtained from the linear interpolation of 2 average signal values obtained by averaging a plurality of signal values existing before and after a predetermined period including the generation time point of the noise, corresponding to each of before and after the generation of the noise, as the correction signal.

The noise reduction apparatus according to the fourth aspect of the present invention is structured such that a level detection means for detecting the whole band level in the demodulated audio signal is further provided, and a selection means is operated according to a relationship between a ratio of the level output of a high band level detection means to the level output of the level detection means, and a predetermined value.

The noise reduction apparatus according to the fifth aspect of the present invention is structured such that the detection sensitivity of the noise detection means is changeable corresponding to the output level of the high band level detection means.

The noise reduction apparatus according to the sixth aspect of the present invention is structured such that the selection means is operated according to the level of an addition signal and the level of a subtraction signal between the right channel signal and the left channel signal constituting the audio signal.

An audio output apparatus according to the seventh aspect of the present invention is provided with the noise reduction apparatus according to any one of the first aspect to the sixth aspect of the invention.

Further, the object of the present invention is to obtain a noise reduction apparatus by which the correction error is not influenced by the other channel, and an audio apparatus.

In the noise reduction apparatus according to the eighth aspect of the present invention, a noise detection means for detecting the noise included in a demodulation signal having the information corresponding to audio signals of a plurality of channels from the demodulation signals; an audio signal demodulation means for demodulating and outputting the audio signals corresponding to each of the plurality of channels from the information corresponding to the audio signals included in the demodulation signals; and a correction means which can correct independently for each audio signal outputted from the audio signal demodulation means according to the output of the noise detection means, are provided.

Further, in the noise reduction apparatus according to the ninth aspect of the present invention, the noise detection means is structured in such a manner that the apparatus conducts the noise detection so that, for each predetermined period which alternates between a plurality of channels, a portion of the period respectively overlaps with each other.

Further, in the noise reduction apparatus according to the tenth aspect of the present invention, the apparatus is structured in such a manner that, according to the output of the noise detection means, a generation condition of the noise is detected, and corresponding to the detected result, the detection sensitivity of the noise detection means is controlled.

Further, in an audio apparatus according to the eleventh aspect of the present invention, the audio apparatus is structured by including any one of the above noise reduction apparatus.

BRIEF DESCRIPTION OF THE DRAWINGS

FIG. 4 is a block diagram showing the structure of the embodiment 2.

FIG. 6 is a block diagram showing the structure of a noise detection means of the embodiment 2.

FIG. 7 is a block diagram showing the structure of the embodiment 3.

FIGS. 20A to 20C are illustration for explaining the waveform in a simple type of a high band correction means.

DETAILED DESCRIPTION OF THE PREFERRED EMBODIMENTS

Figure 1:
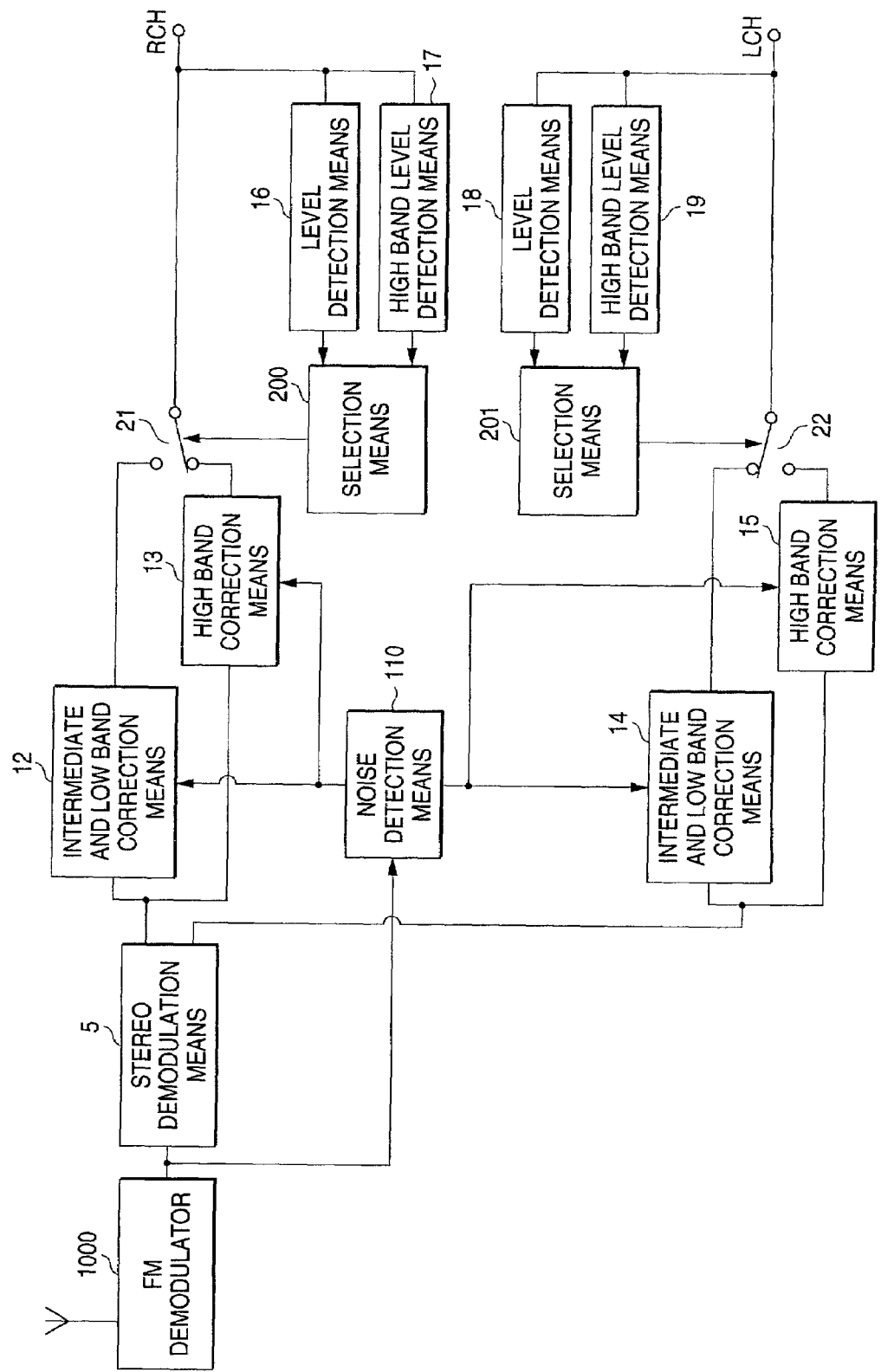
FIG. 1 is a block diagram showing the structure of the embodiment 1.

An embodiment having the structure by which a great effect can be displayed for the noise reduction, when being applied for, for example, a car audio device such as a car radio, an audio output apparatus such as a car video device of a car mounting type television, or an image sound apparatus including this audio output apparatus, will be described below.

Referring to the drawings showing the embodiment, the present invention will be specifically explained below.

Embodiment 1

FIG. 1 is a block structural diagram of a noise reduction apparatus of the embodiment 1 of the present invention.

Numeral 1000 is an FM demodulation means for demodulating an FM signal from a received broadcasting wave, numeral 5 is a stereo demodulation means, numeral 12 is an intermediate and low band correction means for intermediate and low band signals of an Rch of the stereo demodulation means 5, numeral 13 is a high band correction means for a high band signal of the Rch of the stereo demodulation means 5, numeral 21 is a switch for switching output signals of the high band correction means 13 and intermediate and low band correction means 12, and numeral 14 is an intermediate and low band correction means for intermediate and low band signals of an Lch of the stereo demodulation means 5 (herein, the intermediate and low band correction means 12 and 14 are the first correction means provided respectively corresponding to the Rch and Lch).

Numeral 15 is a high band correction means for the high band signal of the Lch of the stereo demodulation means 5, numeral 22 is a switch for switching the outputs of the high band correction means 15 and the intermediate and low band correction means 14, numeral 16 is a level detection means for detecting the level (envelope) of the output signal of the switch 21, and numeral 17 is a high band level detection means for detecting the high band component of the output signal of the switch 21, (herein, the high band correction means 13 and 15 are the second correction means provided respectively corresponding to the Rch and Lch).

Numeral 18 is a level detection means for detecting the level of the output signal of the switch 22, numeral 19 is a high band level detection means for detecting the high band component of the output signal of the switch 22, numeral 200 is a selection means for controlling the switch 21 corresponding to each output level of the level detection means 16 and the high band level detection means 17, and numeral 201 is a selection means for controlling the switch 22 corresponding to each output level of the level detection means 18 and the high band level detection means 19.

Next, operations will be described.

For example, in the car radio as an example of the above audio output apparatus, the broadcasting signal received by the attached antenna enters into the FM demodulator 1000, and the FM demodulation signal is outputted by the FM demodulator 1000. This FM demodulation signal is inputted into the respective stereo demodulation circuit 5 and noise detection means 110, and the following processing, which will be detailed below, is conducted.

Initially, the noise detection means 110 detects the pulsive noise, for example, in the same manner as in the noise detection means 11 in the conventional apparatus. As the output signal of the noise detection means 110, a gate signal of the high level (H level) is outputted, in the period in which the pulsive noise is detected, the gate signal of the low level (L level) is outputted, in the period in which the pulsive noise is not detected, and these gate signal outputs are inputted into the high band correction means 13, intermediate and low band correction means 12, the high band correction means 15, and intermediate and low band correction means 14.

Next, each of correction means 12-15 corrects the input signal (the output from the stereo demodulation means 5) in the period in which the gate signal is the H level, and the input signal is outputted as it is, in the period of the L level. (Correction by the values before and after the correction period)

Herein, the intermediate and low band correction means 12 and 14 linear interpolate (the signal outputted by the linear interpolation is called the correction signal) the signal in the period in which the noise is generated, by using the values before and after the correction period. Incidentally, the correction signal is outputted through the low pass filter.

By using these intermediate and low band correction means 12 and 14, as the result that the signal whose wavelength is long (that is, the frequency is low) to the noise period, is linearly interpolated, an example of a waveform in a case where the correction error becomes the maximum, and as the result that the signal whose wavelength is short (that is, the frequency is high) to the noise period, is linearly interpolated, an example of a waveform in a case where the correction error becomes the maximum, are shown in FIG. 2.

In FIG. 2, ● mark shows the level to be originally obtained when the noise is not generated, and in this example, it corresponds to a point at which the correction error becomes the maximum, and ∇ mark shows the correction value (the correction value by the intermediate and low band correction means 12).

Figure 2A:
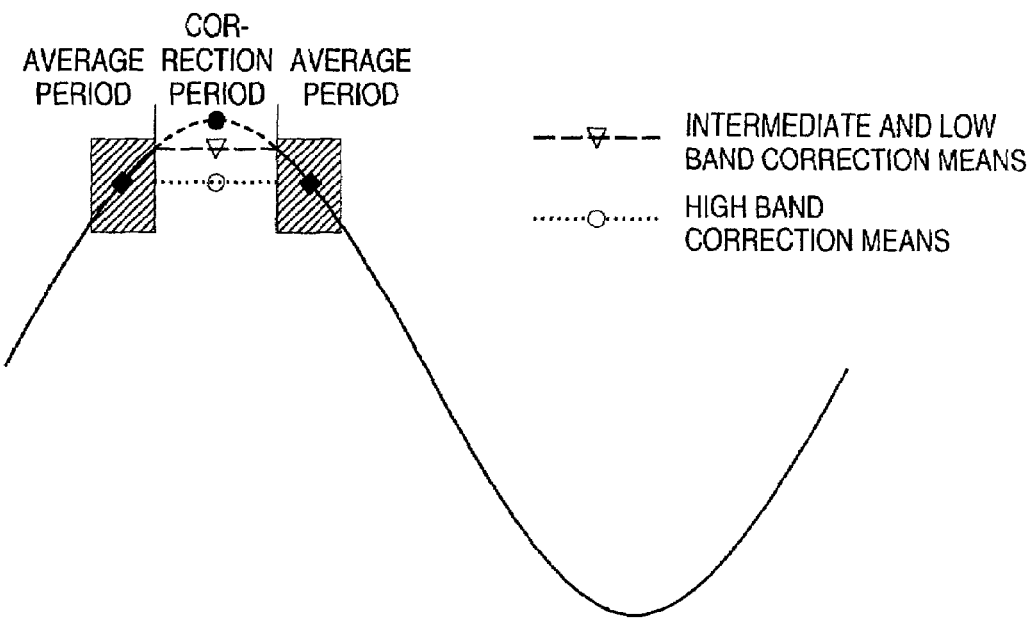
FIGS. 2A and 2B are views showing a corrected waveform of a noise reduction apparatus of the embodiment 1.

FIG. 2A shows a case where the wavelength of the output signal of the stereo demodulation means 5 is long to the correction period (that is, the frequency is low to the correction period), and the level difference (differential value) between ∇ mark and ● mark is small, the error by the correction is very small or slight to the amplitude of the signal waveform. As described above, in the first correction means, the correction signal for correcting the noise according to the signal values which exist just before and just after a predetermined period including the generation time point of the noise is outputted (in the first correction means in the description of each embodiment below, the same operation is conducted except for the specific exception).

Figure 2B:
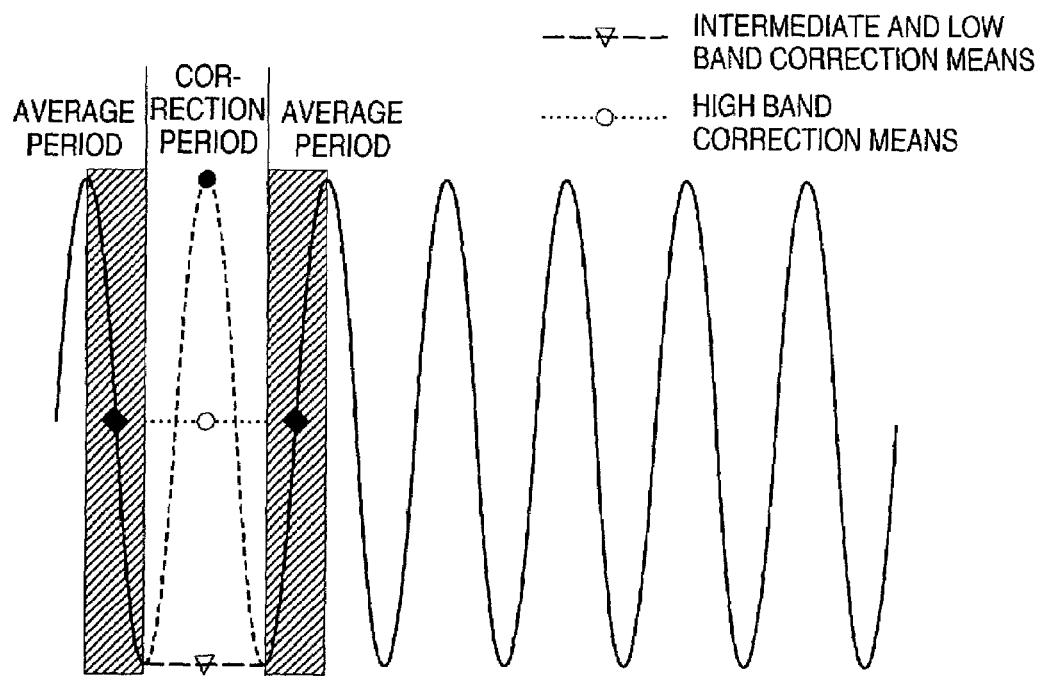

FIG. 2B shows a case where the wavelength of the output signal of the stereo demodulation means 5 is short to the correction period (that is, the frequency is high to the correction period), and the level difference (differential value) between ∇ mark and ● mark is large, and the error by the correction is large to the amplitude of the signal waveform.

That is, when the above interpolation by using the intermediate and low band correction means 12 is conducted on the signal waveform in which the wavelength of the signal waveform is short (that is, the signal waveform of the high frequency), the satisfied suppression effect of the noise can not be obtained.

(Correction by using the average value in the average period)

Next, the high band correction means 13 and 15 conduct the averaging processing before and after the correction period, (♦ mark is the average value in the average period), and by using these two average values (the average signal value as the correction signal), the linear interpolation is conducted. Incidentally, this correction signal (average signal value) is outputted through the low pass filter.

Incidentally, the average period herein means a predetermined period before and after the noise period, and the average value of the signal level in the period is obtained according to a plurality of signal values included in the period.

By using the high band correction means 13 and 15, the waveforms in which the low frequency and the high frequency signals to the correction period are corrected, are shown in FIG. 2.

FIG. 2A shows a case where the wavelength of the output signal of the stereo demodulation means 5 is long to the correction period (that is, the frequency is low to the correction period), and in the level difference from ● mark, ∇ mark is smaller than ○ mark.

FIG. 2B shows a case where the wavelength of the output signal of the stereo demodulation means 5 is short to the correction period (that is, the frequency is high to the correction period), and in the level difference from ● mark, ○ mark is smaller than ∇ mark.

Accordingly, when the wavelength of the signal waveform is sufficiently long to the correction period (that is, the frequency of the signal waveform is low to the correction period), the correction (interpolation processing) is conducted by using the intermediate and low band correction means 12 and 14, and when the wavelength of the signal waveform is short to the correction period (that is, the frequency of the signal waveform is high to the correction period), the correction (interpolation processing) is conducted by using the high band correction means 13 and 15. As described above, in the second correction means, the correction signal for correcting the noise according to a plurality of signal values which exist just after a predetermined period including the generation time point of the noise is outputted (in the second correction means in the description of each embodiment below, the same operation is conducted except for the specific exception).

(Level Detection Means)

Next, the level detection means will be described (hereinafter, for easy understanding, initially the structure according to the series of the Rch will be described).

In the level detection means 16, the level of the signal corrected by using the high band correction means 12 or the intermediate and low band correction means 13, is detected (envelope detection).

Figure 3A:
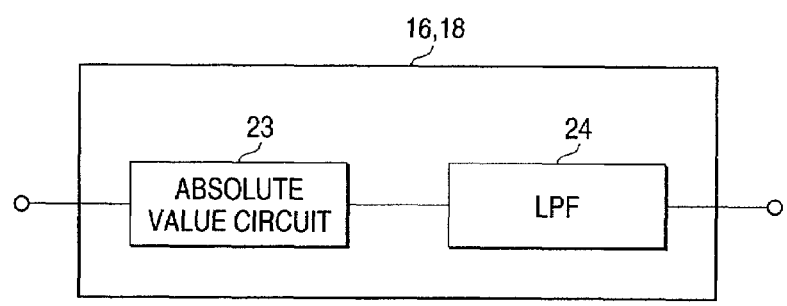
FIGS. 3A and 3B are block diagrams showing the structure of a level detection means after the stereo demodulation of the noise reduction apparatus of the embodiment 1.

The level detection means 16 in this case can be realized by adopting the structure, for example, as in FIG. 3A. Incidentally, herein, the DC component is not included in the output of the switch 21.

In the drawing, numeral 23 is an absolute value circuit, and numeral 24 is a low pass filter (LPF). Initially, in the absolute value circuit 23, the absolute value of the output signal outputted by the switch 21 is obtained, and the high band component is removed by the LPF 24. This output signal of the LPF 24 is outputted as the envelope of the signal outputted from the switch 21.

Incidentally, relating also to the series of the Lch, the level detector 18, for the high band correction means 15 or the intermediate and low band correction means 14 and the switch 22, the structure to which the Rch corresponds, is respectively adopted, and for also the structure of the level detector 18, the same structure as shown in FIG. 3A is adopted, and its operation is also the same.

(High Band Level Detection Means)

Next, the high band level detection means will be described (hereinafter, for simple understanding, initially, the structure according to the series of Rch will be described).

The high band level detection means 17 detects the level of the signal which is corrected by using the high band correction means 12 and intermediate and low band correction means 13 (envelope detection).

Figure 3B:
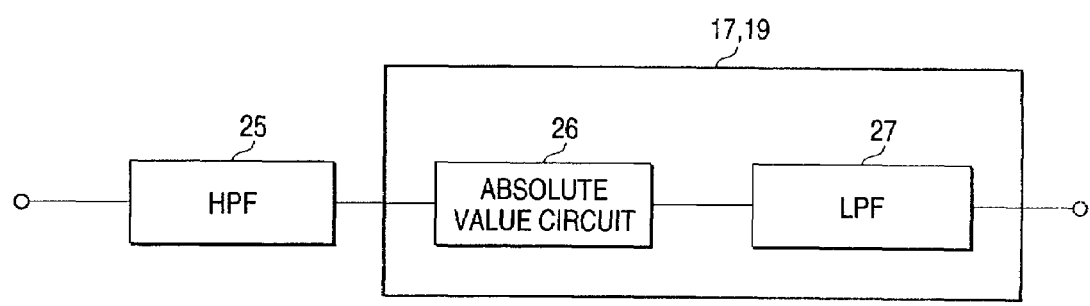

The high band level detection means 17 in this case, can be realized by adopting the structure, for example, as shown in FIG. 3B. Incidentally, herein, a DC component is not included in the output of the switch 21.

In the drawing, numeral 25 is a high pass filter (HPF), numeral 26 is an absolute value circuit, and numeral 27 is a low pass filter (LPF). Initially, in the HPF 25, the low band component of the output signal outputted from the switch 21 is removed, and the high band component is obtained.

Next, in the absolute value circuit 26, the absolute value of the output signal of the HPF 25 is obtained. Next, the high band component is removed by the LPF 27. The output signal of the LPF 27 is outputted as an envelope of the high band component of the signal outputted from the switch 21.

Incidentally, relating also to the series of the Lch, for the high band level detection means 19, the high band correction means 15 or the intermediate and low band correction means 14 and the switch 22, the structure to which the Rch corresponds, is respectively adopted, and for also the structure of the high band level detector 19, the same structure as shown in FIG. 3B is adopted, and its operation is also the same.

(Selection Means)

Next, a selection means 200 will be described. Into the selection means 200, the output signal VH form the high band level detection means 17 and the output signal VA from the level detection means 16 are inputted.

Herein, when the VH/VA is smaller than a predetermined value (that is, the rate of the signal of the high band component is small), because it is considered that the rate of generation of the correction error generated for correcting the high band component signal is small, the selection means 200 connect the output side of the Rch to the intermediate and low band correction means 12 by the switch 21, or the selection means 201 connects the output side of the Lch to the intermediate and low band correction means 14 by the switch 22.

When the VH/VA is larger than a predetermined value (that is, the rate of the signal of the high band component is large), because it is considered that the rate of generation of the correction error generated for correcting the high band component signal is large, the selection means 200 connect the output side of the Rch to the high band correction means 13 by the switch 21, or the selection means 201 connects the output side of the Lch to the high band correction means 15 by the switch 22.

As described above, because the correction means is selected corresponding to the result of the comparison of the ratio of the level VH of the high band component (the envelope of the high band component) in the FM stereo demodulation signal to the level VA of the whole band (the envelope of the whole band), with the predetermined value, the correction error can be decreased.

Further, the above described these processing may also be conducted by the digital signal processing by using the DSP (Digital Signal Processor) after the output signal of the FM detection circuit 1 is A/D converted (Analog to Digital conversion). In this case, in the correction means which is not selected in the intermediate and low band correction means 12 and 14, and the high band correction means 13 and 15, the processing for the correction may be neglected.

Further, as the high band level detection means 17 or 19, a case in which the HPF 25 shown in FIG. 3 is used, is described, however, because, in the stereo demodulated signal, for example, the component higher than 15 kHz is basically unused, the BPF by which the component higher than 15 kHz can be removed, may be used.

Further, a case where the linear interpolation is used for the correction method, is described, however, the signal in the noise period is linearly interpolated, further, passes through the LPF, and after the high band component of the correction error is suppressed, it may be replaced with the signal (noise) in the noise period.

Further, as a more simple type of the high band correction means 13 and 15, an input signal (FIG. 20A) of the high band correction means 13 and 15 is input into an LPF, and holds an output signal level (P of FIG. 20B) of LPF immediately before a pulse noise generation so as to correct (FIG. 20C).

Incidentally, in the above description, the operation of the selection means is determined according to the relationship between the rate (VH/VA) of the VH (the level output of the high band level detection means) to the VA (the level output of the level detection means), and a predetermined value, however, when the signal level of the VH is not extremely large, it is needless to explain that the operation of the selection means may be determined according to the relationship between only the VH and the predetermined value.

Embodiment 2

FIG. 4 is a block structural diagram of the noise reduction apparatus of the embodiment 2 of the present invention. Numeral 5 is a stereo demodulation means, numeral 12 is an intermediate and low band correction means for conduct the correction on the intermediate and low band signal of the Rch of the stereo demodulation means 5, and numeral 13 is a high band correction means for conduct the correction on the high band signal of the Rch of the stereo demodulation means 5.

Numeral 21 is a switch to switch the output signals of the high band correction means 13 and intermediate and low band correction means 12, numeral 14 is an intermediate and low band correction means for an intermediate and low band signal of the Lch of the stereo demodulation means 5, and numeral 15 is a high band correction means for a high band signal of the Lch of the stereo demodulation means 5.

Numeral 22 is a switch to switch the output signals of the high band correction means 15 and intermediate and low band correction means 14, numeral 16 is a level detection means of the output signal of the switch 21, and numeral 17 is a high band level detection means for detecting the high band component of the output signal of the switch 21.

Numeral 18 is a level detection means for detecting the level of the output signal of the switch 22, and numeral 19 is a high band level detection means for detecting the high band component of the output signal of the switch 22.

Numeral 28 is a selection means for controlling the switches 21 and 22 corresponding to each output level of the high band level detection means 17 and 19, and the level detection means 16 and 18, and numeral 111 is a noise detection means for adjusting the sensitivity of the noise detection corresponding to the output from the high band level detection means 17 and 19.

Next, portions whose operation is different from the embodiment 1, will be described. In FIG. 5, a case where a small pulsive noise is corrected, is shown. (Herein, a noise having the amplitude up to 50% of the amplitude level of the signal waveform is called a small pulsive noise).

Figure 5A:
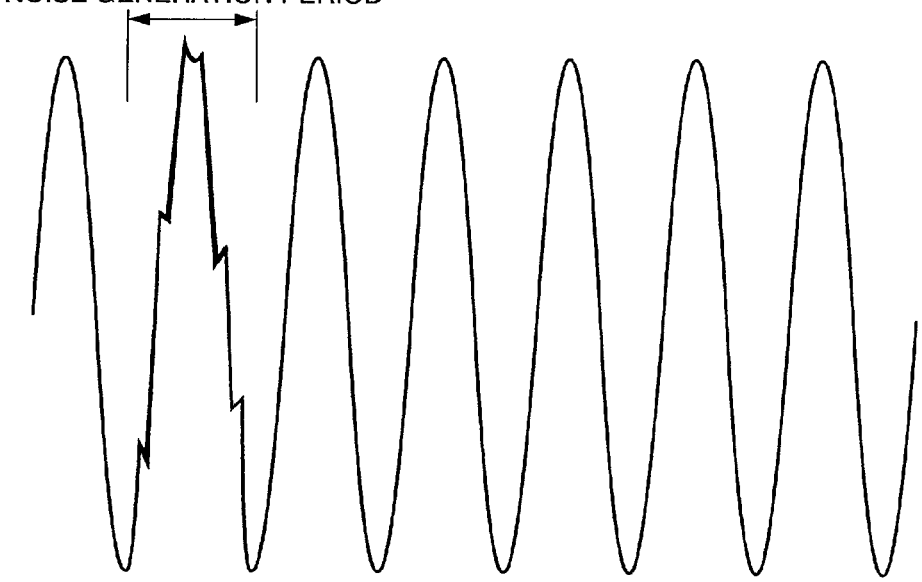
FIGS. 5A and 5B are block diagrams explaining a correction operation of the embodiment 2.
Figure 5B:
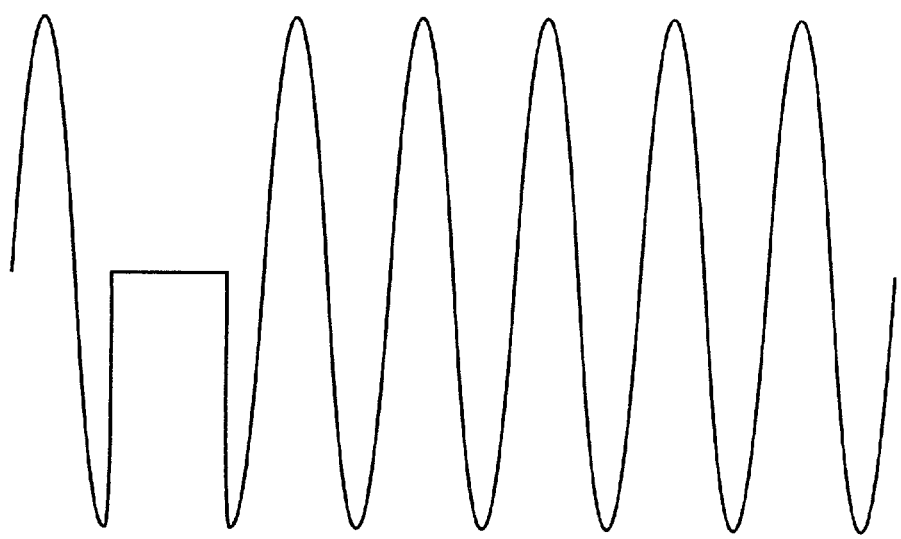
Figure 8:
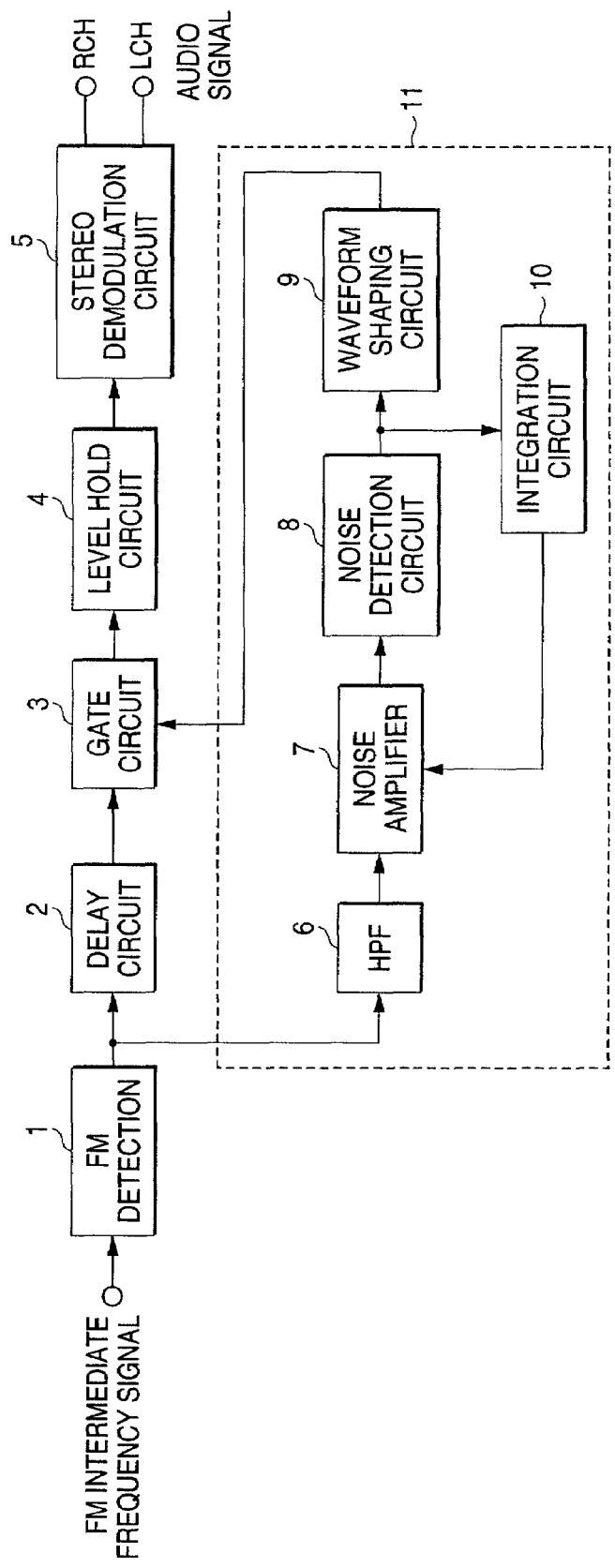
FIG. 8 is a block diagram showing the structure of the conventional noise reduction apparatus.
Figure 9:
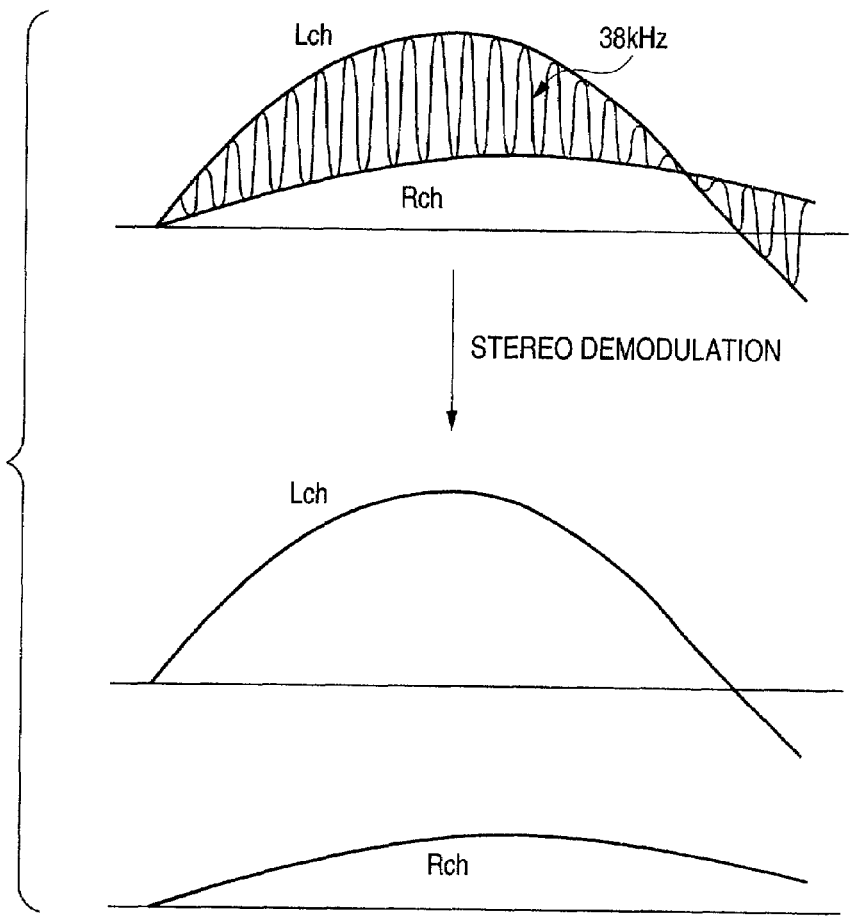
FIG. 9 is a view showing the FM stereo demodulation waveform.
Figure 10A:
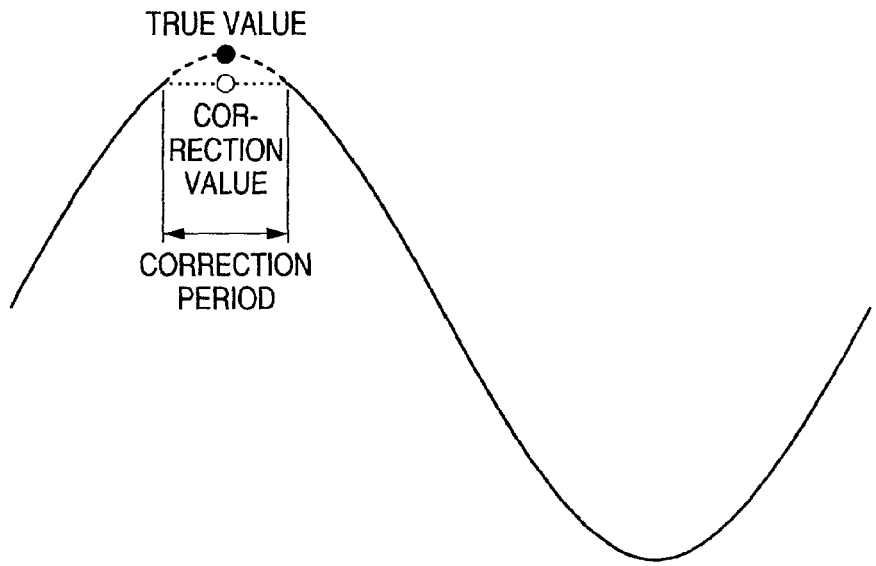
FIGS. 10A and 10B are an example of a noise correction waveform.
Figure 10B:
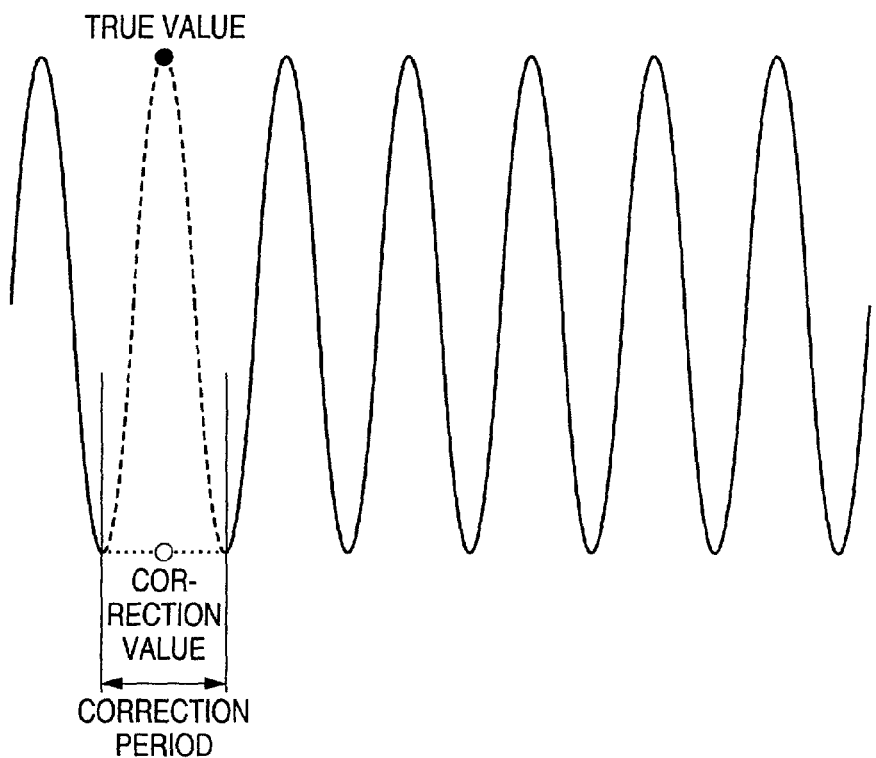

In FIG. 5, FIG. 5A shows an example of a waveform before the small pulsive noise is corrected, and FIG. 5B shows an example of a waveform after the small pulsive noise is corrected. As can be seen from the comparison of FIG. 5A with FIG. 5B, in the example as shown in the drawing, from the result that the level difference (error) is larger in the waveform after the correction than in the waveform before correction (the waveform largely deforms from the original signal waveform. In the example shown in FIG. 5, the waveform is largely deformed in the portion which is corrected from the original sinusoidal wave), there is a case where the noise is rather larger by the correction. Specifically, when the high frequency signal is corrected, because the correction error becomes large, this tendency becomes large.

Accordingly, when the high frequency component is large, the detection sensitivity of the pulsive noise is lowered, so that the small noise is not detected, and the correction by the correction means 12-15 is not conducted.

An example of the detection means 111 by which the above operations can re realized, is shown in FIG. 6. The operations of the HPF 6, noise amplifier 7, waveform shaping circuit 9, and integration circuit 10, which are shown in FIG. 6, are the same as the operations in the conventional apparatus. Further, in the adder 28, the output of the integration circuit 10 and the outputs of the high band level detection means 17 and 19, are given weight through a weight section 29 and a weight section 30 (a coefficient is respectively multiplied, of course, a case where the coefficient is 1, is included), and after that, each output is added, and the addition result is inputted into the noise amplifier 7 as the control signal.

Herein, the larger the above control signal (the result of addition) is, the smaller the noise amplifier 7 makes the gain. Accordingly, the gain of the noise amplifier 7 in the case where the outputs of the high band level detection means 17 and 19 are 0, acts so that the average level of the output signal of the noise detection circuit 8 is kept constant.

The average level of the output signal of the noise detection circuit 8 is smaller than the threshold value of the waveform shaping circuit 9. On the other hand, because, for the signal whose change in time is rapid, the gain of the noise amplifier 7 does not change, when the pulsive noise is added to the noise amplifier 7, the output of the noise detection circuit 8 is larger than the threshold value of the waveform shaping circuit 9, and the waveform shaping circuit 9 outputs the H level and the pulsive noise is detected.

Herein, even when the pulsive noise smaller than the difference between the average value of the output of the noise detection circuit 8 and the threshold value of the waveform shaping circuit 9 is generated, it is not detected. Accordingly, when up to the small pulsive noise is detected, the difference between the average value of the output of the noise detection circuit 8 and the threshold value of the waveform shaping circuit 9 is made small, and when the small pulsive noise is not detected, the difference between the average value of the output of the noise detection circuit 8 and the threshold value of the waveform shaping circuit 9 may be made large.

Next, when many high band signals are included in the stereo demodulation signal, and outputs of the high band level detection means 17 and 19 become large, because the control signal of the noise amplifier becomes large, the gain of the noise amplifier 7 becomes small corresponding to that.

Accordingly, the average value of the output signal of the noise detection circuit 8 becomes small, and because the difference to the threshold value of the waveform shaping circuit 9 becomes large, the small pulsive noise is not detected.

As described above, when the level of the high band component of the FM demodulated signal of the stereo is large, because the detection sensitivity of the pulsive noise is lowered (that is, the detection sensitivity is changeable corresponding to the output level of the high band level detection means), the correction error due to the correction of the small pulsive noise is decreased.

Further, above described these processing may A/D convert the output signal of the FM detection circuit 1, and the processing after that may be conducted by using the digital signal processing technique such as the DSP. Incidentally, in this case, in the intermediate and low band correction means 12 and 14, and the high band correction means 13 and 15, the processing for the correction in the correction means which is not selected, can be neglected.

Embodiment 3

FIG. 7 is a block structural diagram of the noise reduction apparatus of the embodiment 3 of the present invention. In the drawing, numeral 112 is a noise detection means for detecting the pulsive noise from the output of the FM detection circuit 1, numeral 120 is an intermediate and low band correction means for conducting the correction on the intermediate and low band signals when there are many intermediate and low band components, in the output signals of the FM detection circuit 1, numeral 130 is a high band correction means for conducting the correction on the high band signals when there are many high band components, in the output signals of the FM detection circuit 1, and numeral 21 is a switch to switch the outputs of the intermediate and low band correction means 120 and the high band correction means 130.

Numeral 5 is a stereo demodulation means connected to the output signal of the switch 21, numeral 160 is a level detection means for detecting the level of the Lch signal of the stereo demodulation means 5, numeral 170 is a high band level detection means for detecting the high band signal level in the Lch signals of the stereo demodulation means 5, and numeral 180 is a level detection means for detecting the signal level of the Rch signal of the stereo demodulation means 5.

Numeral 190 is a high band level detection means for detecting the high band signal level in the Rch signal of the stereo demodulation means 5, numeral 300 is an L−R level detection means for detecting the level of the L−R component which is the difference between the signal level of the Lch signal and the signal level of the Rch signal (the level of the subtraction signal. incidentally, R−L component may be allowable), and numeral 301 is an L+R level detection means for detecting the level of the L+R component which is the sum of the signal level of the Lch signal and the signal level of the Rch signal (the level of the addition signal).

Numeral 400 is a selection means for switching the switch 21 corresponding to each of outputs of the level detection means 160 and 180, high band detection means 170 and 190, and L−R level detection means 300.

Next, operations will be described. Initially, the noise detection means 112 detects the pulsive noise, for example, in the same manner as the detection means 11 in the conventional apparatus. The output signal of the noise detection means 112 outputs the high level (H level) in the period in which the pulsive noise is detected, and the low level (L level) in the period in which the pulsive noise is not detected, and it is inputted into the high band correction means 130 and the intermediate and low band correction means 120.

Next, the correction means 120 and 130 correct the signals in the period in which the gate signal is the H level. Herein, the output signal to be corrected of the FM detection circuit 1 is composed of the L+R component of 0 to 15 kHz, L−R component which is AM modulated with 38 kHz in the band of 23 to 53 kHz, and the pilot signal of 19 kHz.

Accordingly, when, on the signal in which many L−R components are included, the correction corresponding to the pulsive noise with the width of several tens μs is conducted, there is also a case in which the pulsive noises of several wavelengths exist in the correction period, and when the pre-value holding, or linear interpolation is simply conducted, there is a case in which the correction error rather becomes large. In this case, the high band correction means 130 is used, and the error due to the correction is made small.

Further, when the L−R components are small in the output signal of the FM detection circuit 1, the components of 23 kHz to 53 kHz are small, and when the high band components in the L+R components are small, because it is equivalent to that the high band components in the output signals of the FM detection circuit 1 are small, by simply conducting the pre-value holding or linear interpolation, the correction error can be made small.

Accordingly, in this case, when the following (1) and (2) are satisfied, the selection means 400 operates in such a manner that the switch 21 is connected to the intermediate and low band correction means 120.

(1) When the output of the L−R level correction means 300 is sufficiently smaller than the output signal of the L+R level detection means 301.

(2) When the output of the high band level detection means 170 and 190 is sufficiently smaller than the output of the level detection means 160 and 180.

Herein, the output signal of the L−R level detection means 300 is obtained from the output in which, for example, the absolute value of the difference between the stereo demodulated Lch and Rch is inputted into the LPF. Further, the output signal of the L+R level detection means 301 is obtained from the output of the LPF in which, for example, the absolute value of the sum of the Lch signal and Rch signal which are FM demodulated into the stereo, is an input.

As described above, when the above conditions of (1) and (2) are satisfied, because the high band signal components are few in the output signal from the FM detection circuit 1, when the correction is conducted simply by the linear interpolation, the difference from the original demodulation signal can be made rather small.

Further, the above described these processing may be conducted as follows: the output signal of the FM detection circuit 1 is A/D converted, and the subsequent processing is conducted by using the digital signal processing technique such as the DSP.

Further, in the description of the above embodiments, the processing is conducted on the signal after the stereo FM demodulation, and the processed signal is inputted into the selection means 400, however, the signal level of the high band in the composite signal in which the output signal of the switch 21 is corrected, is detected, and when it is small, because the L−R component is small, and further, the high band component of the signal which is FM demodulated into the stereo is also small, the switch 21 may be connected to the intermediate and low band correction means 120.

As described above, according to the present invention, the following effects can be obtained.

In the noise reduction apparatus according to the first aspect of the present invention, the apparatus is provided with: a noise detection means for detecting a noise included in a demodulated audio signal; the first correction means for outputting a correction signal for correcting the noise according to a signal value existing just before and just after a predetermined period including a generation time point of the noise in the demodulated audio signal which is detected by the noise detection means; the second correction means for outputting the correction signal for correcting the noise according to a plurality of signal values respectively existing before and after the predetermined period including the generation time point of the noise in the demodulated audio signal which is detected by the noise detection means; a high band level detection means for detecting the level of a high band component of the audio signal; and a selection means for selecting either one of the first or the second correction means according to the output of the high band level detection means, thereby, even when the high frequency components are included in the audio signal, the high frequency components are detected, and when the rate of the high frequency components is large, because the correction in which the error is few to the high frequency signal, is selected, the correction error when the rate of the high frequency components is large, can be decreased.

In the noise reduction apparatus according to the second aspect of the present invention, because the first correction means is structured such that it outputs a low pass filter output of a signal value obtained from a linear interpolation of 2 signal values existing just before and just after a predetermined period including a generation time point of the noise, as a correction signal, thereby, the correction error when the rate of the low frequency components is large, can be decreased.

In the noise reduction apparatus according to the third aspect of the present invention, because the second correction means is structured such that it outputs a low pass filter output of the signal value obtained from the linear interpolation of 2 average signal values obtained by averaging a plurality of signal values existing before and after a predetermined period including the generation time point of the noise, corresponding to each of before and after of the generation of the noise, as the correction signal, thereby, the signal correction when the rate of the high frequency components is large, can be accurately corrected, and the correction error can be decreased.

In the noise reduction apparatus according to the fourth aspect of the present invention, because the apparatus is structured such that a level detection means for detecting the whole band in the demodulated audio signal is further provided, and a selection means is operated according to a relationship between a ratio of the level output of a high band level detection means to the level output of the level detection means, and a predetermined value, thereby, even when the output from the high band level detection means is large, the noise can be surely caught.

In the noise reduction apparatus according to the fifth aspect of the present invention, because the noise detection means is structured such that the detection sensitivity of the noise detection means is changeable corresponding to the output level of the high band level detection means, thereby, the generation of large error due to the correction in the case where the low level noise is included, can be prevented.

In the noise reduction apparatus according to the sixth aspect of the present invention, because the apparatus is structured such that the selection means is operated according to the level of an addition signal and the level of a subtraction signal between the right channel signal and the left channel signal constituting the audio signal, thereby, the correction suited to the received signal can be conducted.

In an audio output apparatus according to the seventh aspect of the present invention, because the apparatus is provided with the noise reduction apparatus according to the first aspect to the sixth aspect, thereby, the audio output apparatus by which, even when the noise is included, the optimum correction to the noise is conducted, and the high quality audio output can be obtained, can be realized.

An embodiment having the structure by which a great effect can be displayed for the noise reduction, when being applied for, for example, a car audio device such as a car radio, an audio output apparatus such as a car video device of a car mounting type television, or an image sound apparatus including this audio output apparatus, will be described below.

Referring to the drawings showing the embodiment, the invention will be specifically explained.

Embodiment 4

Figure 11:
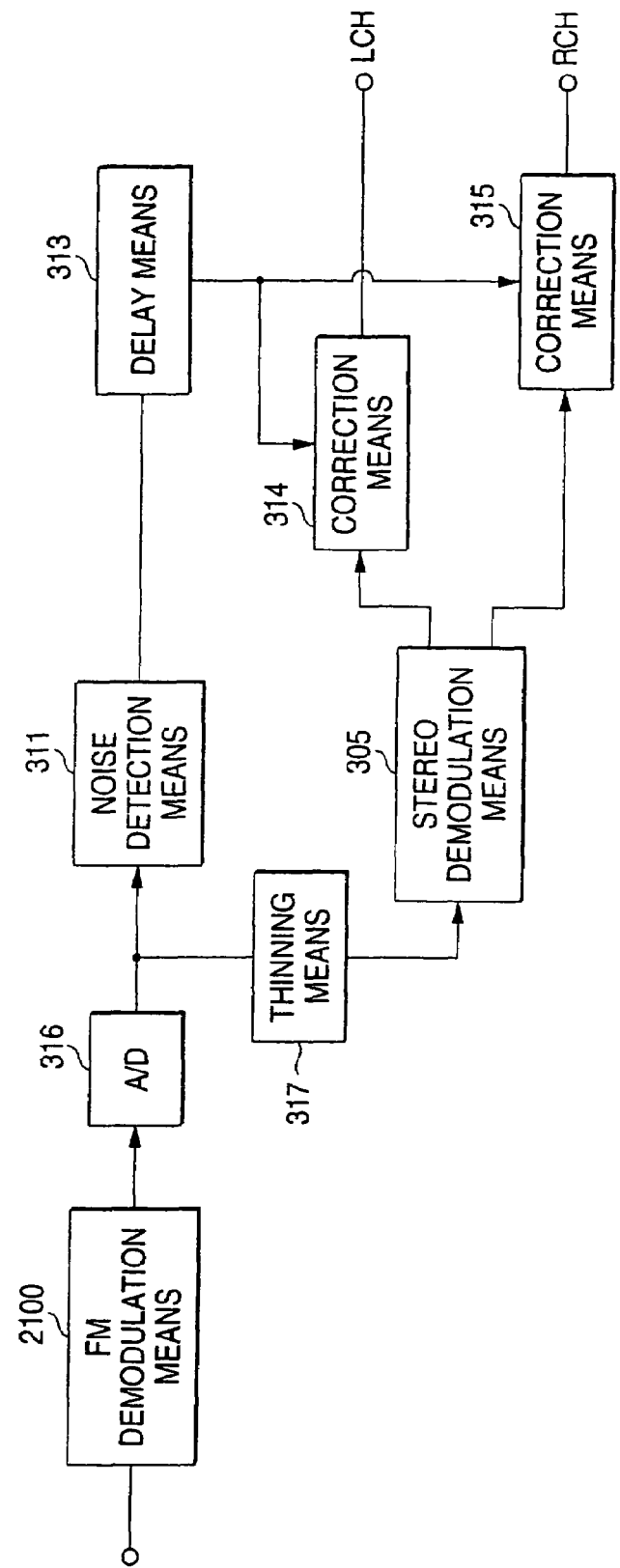
FIG. 11 is a block diagram showing the structure of a noise reduction apparatus.

FIG. 11 is a block structural diagram of the noise reduction apparatus of the embodiment 4 of the present invention. In the drawing, numeral 2100 is an FM demodulation means for demodulating an FM signal from a received broadcasting wave, numeral 305 is a stereo demodulation means, numeral 313 is a delay means for adjusting a timing between an output signal from the noise detection means and an output signal from the stereo demodulation means 305, numeral 314 is an Lch correction means, numeral 315 is an Rch correction means, numeral 316 is an A/D converter means, and numeral 317 is a thinning means for thinning out the data of the A/D converter means 316.

Incidentally, for simplification here, a case where the audio signals of two channels of the Lch and Rch are demodulated, will be described, however, it is not necessarily limited to these two channels, but it can also be applied, in the same manner, even for the audio apparatus having a plurality of channels which is more than this case.

Next, operations will be described. For example, in the car radio as an example of the audio output apparatus, by an antenna attached to the apparatus, the received broadcast signal is FM-demodulated by the FM demodulator means 2100, and the demodulated signal (demodulation signal) is converted into a digital data by the A/D converter means 316.

Herein, the demodulated signal (FM demodulation signal f(t) as the demodulation signal) by the FM demodulation means 2100, can be expressed by the following equation:

$$f(t)=\{L(t)+R(t)\}/2+p+\{L(t)+R(t)\} \text{SIN}(\omega t)/2 \quad (1)$$

Where L(t): the left channel signal
R(t): the right channel signal
p: a pilot signal of 19 kHz
ω: the angular velocity of twice of the pilot signal p
(that is, 2π×38 kHz rad/sec).

Figure 12:
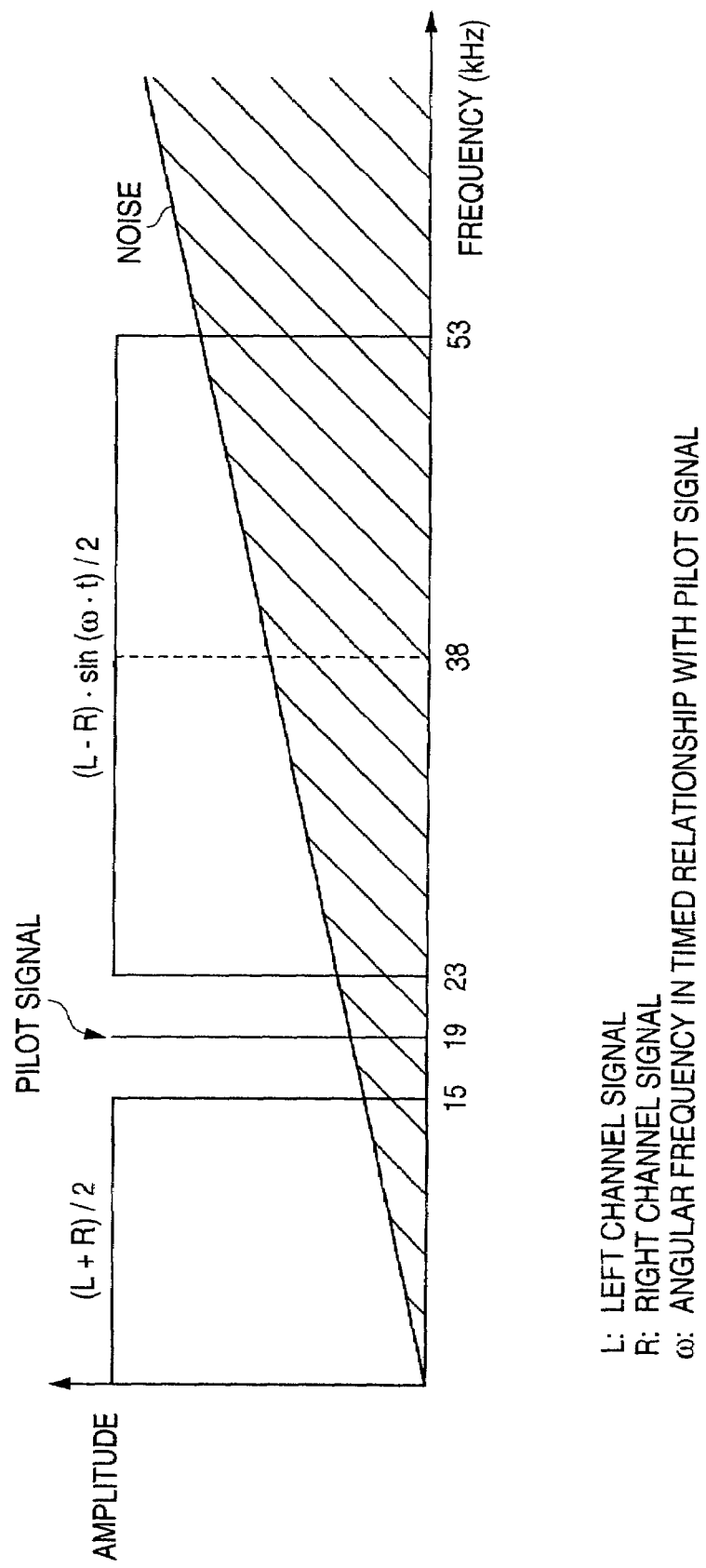
FIG. 12 is an illustration for explaining the spectrum of an FM demodulation signal.

When the FM demodulation signal f(t) is expressed by graduating the frequency on the horizontal axis, it will be as shown in FIG. 12.

As shown in FIG. 12, in the FM demodulation signal f(t), the signal component up to 53 kHz is included.

The thinning means 317 lowers the sampling frequency of the output signal from the A/D converter 316, to the degree which at least satisfies the Nyquist frequency (106 kHz) of 53 kHz which is the highest frequency of the FM demodulation signal f(t), as described above, and outputs to the stereo demodulation means 305.

Next, the stereo demodulation means 305 will be described.

As will be understood from the equation (1), it is found that, when Sin(ωt)=1, f(t)=L(t)+p, and when Sin(ωt)=−1, f(t)=R(t)+p. Incidentally, in this case, p is the pilot signal component, and because it is cancelled, for example, in the rear stage of the thinning means 317, even when it is processed in such a manner that, when Sin(ωt)=1, f(t)=L (t), and when Sin(ωt)=−1, f(t)=R(t), there is no practical problem.

That is, in order to take out each of signals of Lch and Rch from the FM demodulation signal f (t), the sampling may be conducted at the timing when Sin(ωt)=1 or Sin(ωt)=−1, by the A/D converter 316, being in timed relationship with the pilot signal p.

In this case, for example, as the input signal to the stereo demodulation means 305, when it is made to be in timed relationship with the pilot signal in which the sampling frequency is 4 n times (n is an integer) of 38 kHz, each of signals of Lch and Rch can be taken out in such a manner that the signal of the Lch can be taken out, when the sampling is conducted at the timing of every 4 n, and the signal of Rch can be taken out, when the sampling is conducted at the timing of every 4 n in which 2 n is shifted from the timing of every 4 n.

Figure 13:
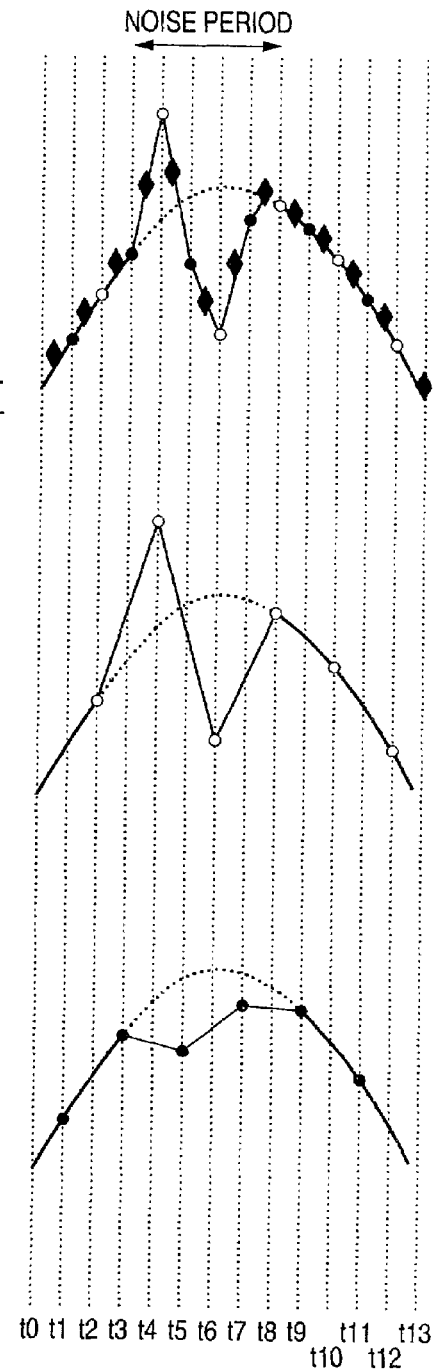
FIGS. 13A to 13C are illustration for explaining the stereo demodulation signal of the signal in which the pulsive noise is generated.

Next, the correction period of the Lch and Rch when the pulsive noise is generated, will be described. In FIG. 13, the waveform in which the pulsive noise as the noise, mixes in the output signal of the FM demodulation means 301 in the case where the waveforms of the Lch and Rch are essentially the same, is shown. FIG. 13A shows the output from the FM demodulation means 301, and · is a sample value of the Lch, ○ is the sample value of Rch, and ♦ is the sample value of the other timings.

The sample value at the timing of the above ♦ mark is a value which is sampled for basically detecting the generation position of the noise or the generation time, and is obtained by, for example, the sample frequency in which the sample period is such as 60 kHz-100 kHz, which is higher than 53 kHz.

Further, FIG. 13B shows the Rch signal after the stereo demodulation, and FIG. 13C shows the Lch signal after the stereo demodulation. In the example of FIGS. 13B and 13C, the condition that the mixed pulsive noise is generated, in which the pulsive noise for 2 sampling is mixed in the Lch and the pulsive noise for 2 sampling is mixed in the Rch, is shown.

In this example, when the start position of the noise is viewed, respectively, in the Lch signal, the start position is t5, and in the Rch signal, the start position is t4. In this case, respectively for the Lch signal and Rch signal, the correction is conducted at the independent timing, that is, the correction means 315 corrects the Rch signal at t2 and t8, and the correction means 314 corrects the Rch signal at t3 and t9.

The correction in this case is conducted in such a manner that, when so called front hold type interpolation by which, for example, the t2 value is corrected to t4 and t6 values (Rch), or the t3 value is corrected to t5 and t7 values (Lch), or so called linear interpolation type interpolation by which the correction value is the value (Rch) corresponding to each time of t4 and t6 when the linear interpolation is conducted at the t2 value and the t8 value, or the correction value is the value (Lch) corresponding to each time of t5 and t7 when the linear interpolation is conducted at the t3 value and the t9 value, is adopted, the signal is corrected.

Next, the noise detection means 311 as the noise detection means will be described. In order to detect the pulsive noise, it is better for easy detection of the noise to use the band which does not overlap with the FM demodulation signal. That is, as described above, in the noise detection means 311, the pulsive noise is detected by using the higher frequency signal than each sampling frequency of the Lch and Rch (thereby, the resolution of the noise detection is determined.)

The output signal (noise detection signal) from the noise detection means 311 outputs the gate signal of the H level in a period in which the noise is detected, and the L level in a period in which the noise is not detected.

In this example, the period in which the noise generates, is from t4 to t7, and in this period, the detection means 311 outputs the H level, and the sampling frequency of the output data in the noise detection means 311 in this case, is not smaller than 2 times of the sampling frequency of the Lch signal or Rch signal.

On the one hand, in the FM stereo demodulation, when the demodulation of the maximum frequency 53 kHz in the signal outputted from the FM demodulation means 301 can be surely carried out, in order to reduce the processing amount in this case, when the thinning means 317 is used, in this thinning means 317, the delay is generated in the inputted signal into the stereo demodulation means 305. Incidentally, the delay is also generated in the correction means 314 and 315.

Therefore, by using the delay means 313, the output signal from the noise detection means 311 is delayed, and the time point (position) at which the pulsive noise in the output signal of the stereo demodulation means 305 in which the delay is generated, is generated, is timed with the noise detection signal outputted from the noise detection means 311.

As described above, the noise is detected from the FM stereo demodulated signal, and because a signal portion in which the pulsive noise of the FM stereo demodulated signal is mixed (generated) is corrected independently in the left and right, (viewed from respective channels), the amplitude of the signal of the other channel does not influence on the correction result, and the suppression effect of the noise is increased.

That is, because, in the correction of the signal of one channel, the influence of the other channel is not caused, and further, the noise is detected for the demodulation signal, the noise detection can be conducted under the condition that the noise component is not lost.

Figure 14:
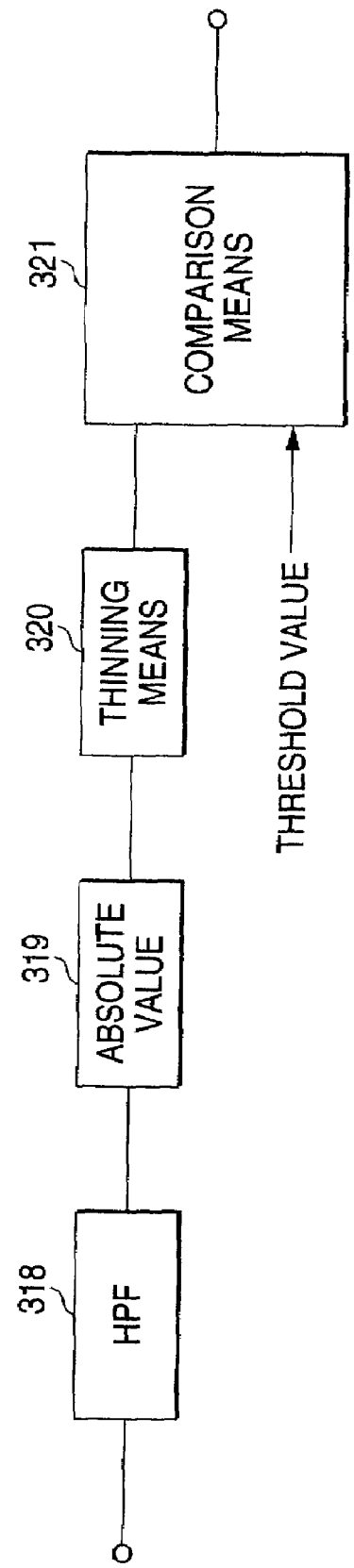
FIG. 14 is a block diagram showing the structure of a noise detection means.

FIG. 14 shows the noise detection means 311 by the digital processing. The component of the high frequency is extracted by the HPF 318 from the output of the A/D converter 316. When the pulsive noise is generated, the output level of the HPF 318 is increased. Next, the absolute value of the output signal of the HPF 318 is calculated in the absolute value circuit 319.

Figure 15A:
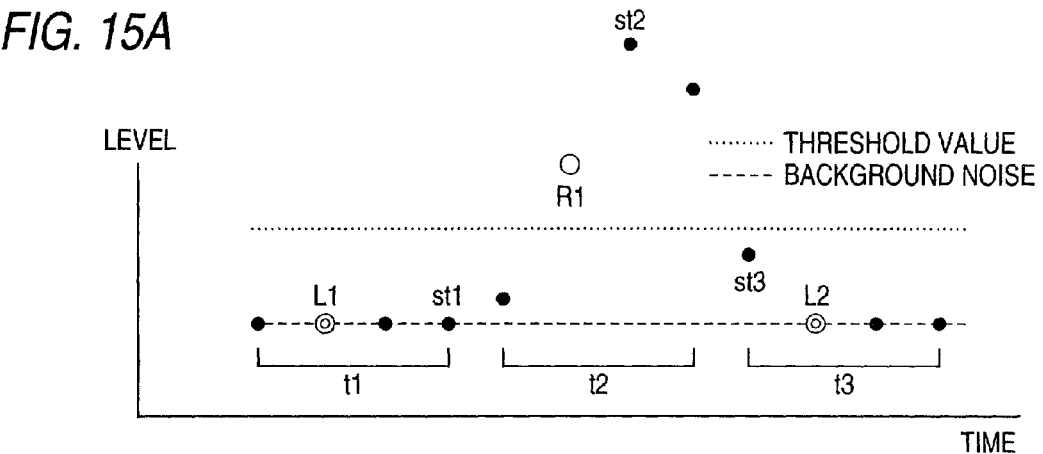
FIGS. 15A and 15B are illustration for explaining the output of an absolute value circuit.

Next, the thinning means 320 will be described. The output of the absolute value circuit 319 when the sampling frequency of the A/D converter 316 is fs=304 kHz, is shown in FIG. 15. In FIG. 15, ◎ shows the sample value of the Lch, ○ shows the sample value of the Rch, and · shows the other sample value. In FIG. 15A, the maximum values st1, st2, and st3 of the t1, t2, and t3 periods are outputted as the noise levels of L1, R1 and L2.

Next, when the output of the thinning means 320 is not smaller than the threshold value inputted by the comparison means 321, it is judged that the noise is generated in the Lch or Rch signal in the period at the time. In this case, because st2 is not smaller than the threshold value, it is judged that the noise is generated in R1.

Further, the pulse width of the pulsive noise included in the output signal of the A/D converter 316 spreads due to the filter processing by, for example, the FIR filter in the thinning means 317, and the stereo demodulator 305. Accordingly, even when the noise is slightly generated in L2, there is a case in which it becomes as if the noise is generated in the signal after the stereo demodulation.

Figure 15B:
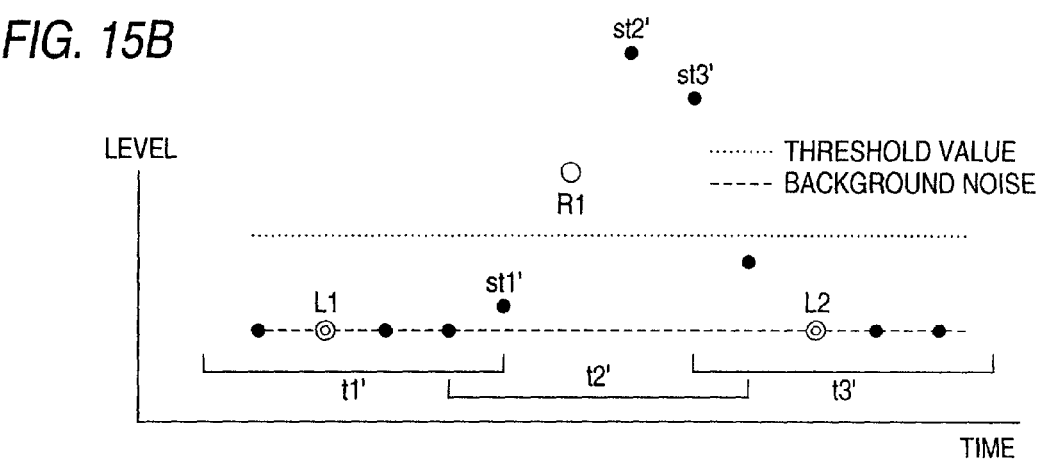

In this case, the thinning means 320 makes the period to detect the noise of L1, R1, and L2 overlap with each other as t1', t2' and t3' shown in FIG. 15B, and outputs the maximum values of the respective periods of st1', st2', and st3' as the noise levels of L1, R1 and L2.

Next, because points, at which the outputs of the thinning means 320 are not smaller than the threshold value, are st2' and st3', the comparison means 321 judges that the pulsive noise is generated at R1 and L2.

As described above, the period in which the sample noise such as L2 is detected, is overlapped, and can be detected as the noise exists therein, wherein the large noise exists in the near sample of L2, and after the stereo demodulation, the influence of the noise is exerted on L2.

According to this, because the noise detection means is structured in such a manner that, for each predetermined period which alternates among a plurality of channels, a portion of the period is made to overlap each other, and the noise is detected, thereby, the noise detection means can more exactly detect the noise.

In FIG. 15B, the detection of the noise by which 1 sample is made to overlap the other, and the influence is exerted on the subsequent signal, is described, however, the overlap of the sample may be carried out on a plurality of points, and it may be determined by considering the pass band characteristic of the filter processing by, for example, the FIR filter (specifically, the LPF included in these structures) in the thinning means 317, or the stereo demodulator 305, or the amplitude level.

Further, in the case where the density of the pulsive noise is large, when all of pulsive noises are corrected, there is a tendency that the original sound collapses and becomes the sound which is artificial and offensive to the ear.

In such the case, there is a case in which the audio reproduction which is slightly offensive to the ear can be carried out, when the large pulsive noise is corrected, and the small pulsive noise is not corrected. Accordingly, in order to correspond to such the case, the detection sensitivity of the pulsive noise may be controlled so that the pulse width of the detected pulsive noise is not larger than a predetermined value (predetermined width).

Figure 16:
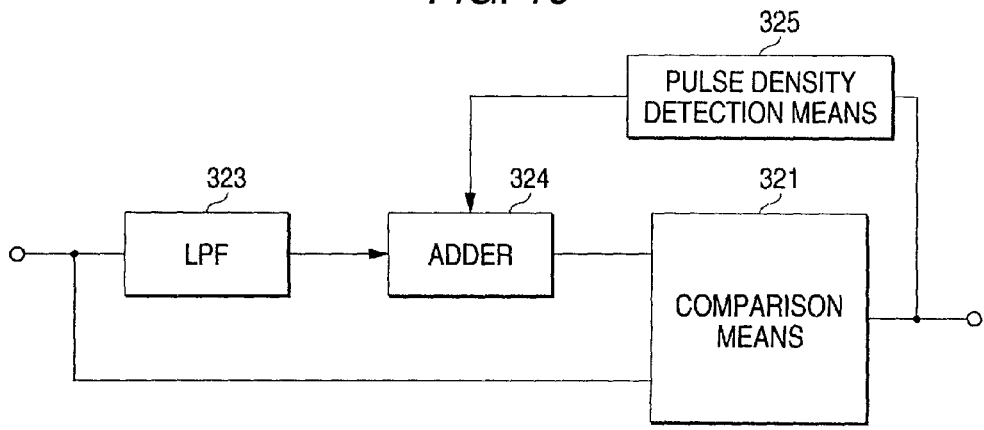
FIG. 16 is a block diagram for explaining the structure for controlling the pulse density.

The structure by which the density of the pulsive noise to be detected (herein, sometimes simply called pulse density) can be controlled, is shown in FIG. 16 (incidentally, in the structure shown in FIG. 16, the output of the thinning means 320 of the noise detection means 311 shown in FIG. 14 is changed to the input. The noise detection means 311 is structured by including the structure shown in FIG. 14 and the structure shown in FIG. 16.)

In the structure shown in FIG. 16, by supplying the output of the comparison means 321 shown in FIG. 14 to the LPF 323, the output is smoothed, and supplied to the adder 324.

Herein, the output signal of the LPF 323 corresponds to the level of the continuously generating noise such as the background noise (due to the noises of the devices or the thermal noise).

The adder 324 adds the output signal of the LPF 323 and the output of the pulse density detection means 325, and when the output of thinning means 320 is larger than the output signal of the adder 324, the comparison means 321 judges that the pulsive noise exists.

The output signal of the comparison means 321 is inputted into the pulse density detection means 325, and when the pulse density of the inputting signal is higher than a predetermined value, the output signal is made larger and inputted into the adder 324. Thereby, the output signal of the adder 324 becomes large. That is, by the pulse density detection means 325, the feedback loop is structured between the output of the comparison means 321 and the adder 324.

Figure 17:
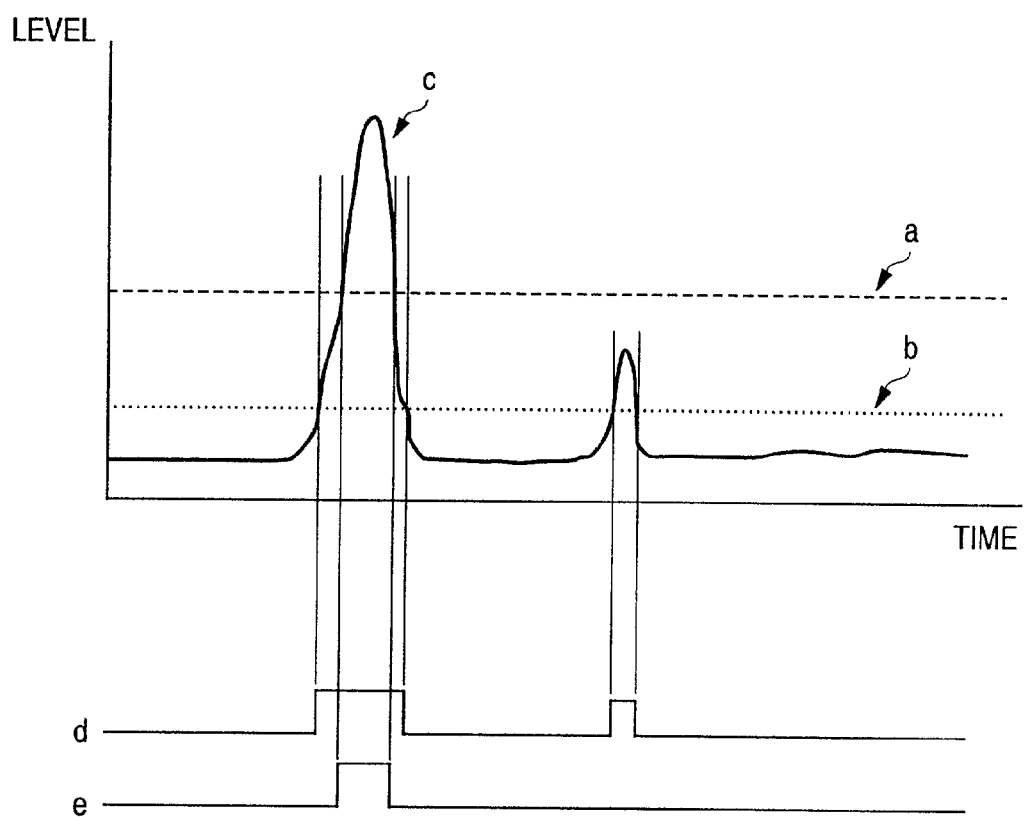
FIG. 17 is an illustration for explaining the detection of a pulsive noise.

FIG. 17 is a view showing an example of the operation by the structure shown in FIG. 16. The output of the adder 324 when the pulse density is small is shown by the waveform b. Further, the output of the adder 324 when the pulse density is increased and the output of the pulse density detection means 325 is inputted into the adder 324, is shown by the waveform a (incidentally, in the drawing, the waveforms a and b are linearly shown for the simplification, but, generally these are waveforms).

An example of the output from the thinning means 320 is shown by the waveform c. When the pulse density is low, the waveform b is inputted into the comparison means 321 as the threshold value 321. In the case shown in the drawing, the comparison means 321 outputs the H level as the pulsive noise is generated in a portion of the waveform c whose value is larger than the waveform b inputted as the threshold value. Accordingly, in the example shown in the drawing, it is shown that the pulsive noises of 2 portions are detected as shown in the waveform d.

On the other hand, when the pulse density is high, the waveform a is inputted into the comparison means 321 as the threshold value. In the case as shown in the drawing, the comparison means 321 outputs the H level as the pulsive noise is generated in a portion of the waveform c whose value is larger than the waveform a inputted as the threshold value. Accordingly, in the example shown in the drawing, the small pulsive noise as shown in the waveform e is not detected.

Figure 18:
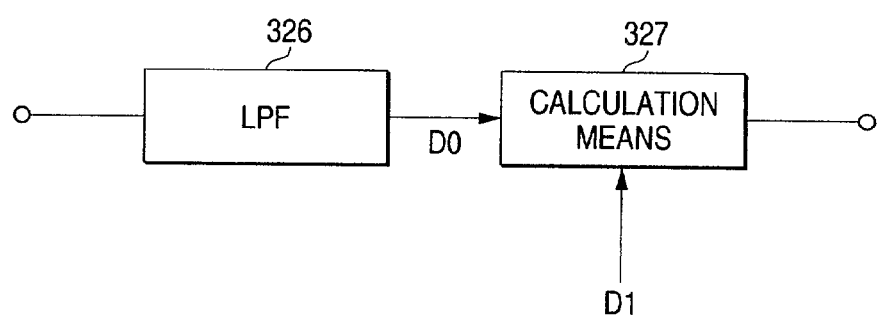
FIG. 18 is a block diagram showing the structure of a pulse density detection means.
Figure 19A:
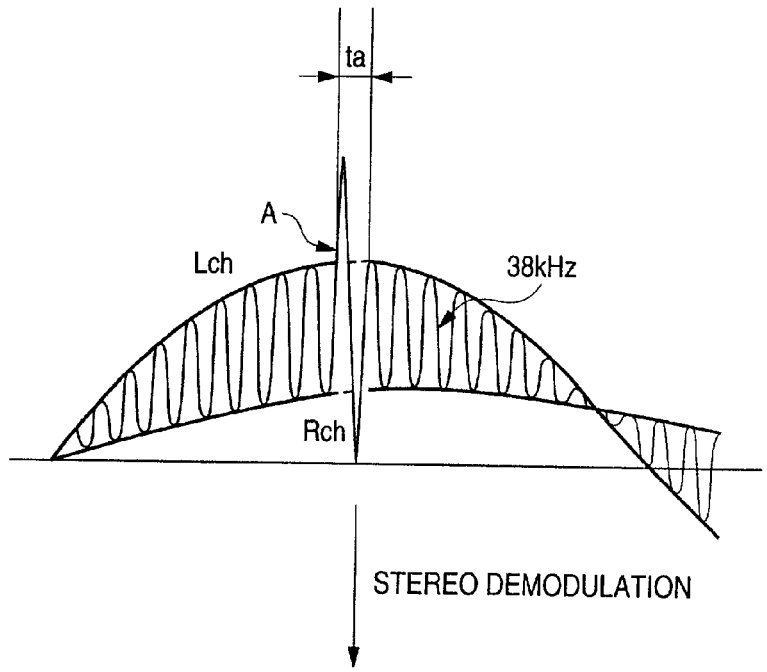
FIGS. 19A to 19C are illustration for explaining the waveform when the signal in which the pulsive noise is generated, is stereo-demodulated by the conventional apparatus.
Figure 19B:
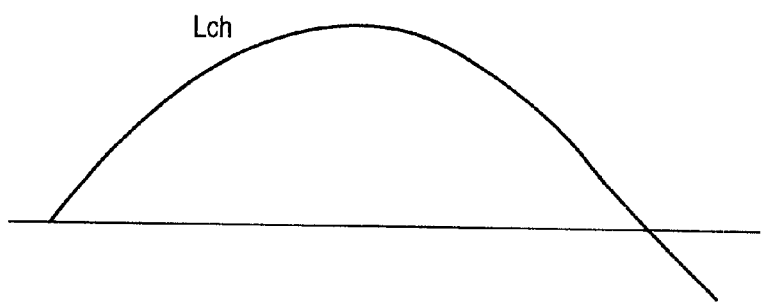
Figure 19C:
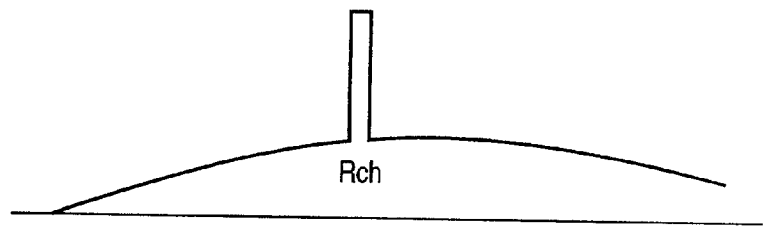

Next, the structural drawing of the pulse density detection means 325 is shown in FIG. 18. The peak value of the output signal of the comparison means 321 shown in FIG. 16 is constant, and inputted into the LPF 326, and the DC component D0 is taken out. The DC component D0 in this case is proportional to the pulse density.

The calculation means 327 conducts the following processing, in which the desired value of the pulsive noise to be detected is D1, and the output signal is the feedback amount Nc (A is a feedback gain, and is a fixed value herein).

$$Nc = Nc + A \cdot (D0 - D1)$$

As the result, when Nc<0, Nc=0 is set. According to this processing, when the pulse density is larger than the desired value, the feedback amount Nc is increased. According to the above processing, the density of the pulsive noise to be detected is adjusted.

When the system is structured in such a manner that the detection sensitivity of the noise detection means is controlled according to the density of the pulsive noise (noise) as the generation condition of the noise, the lowering of the audio quality due to the excessive signal correction can be prevented.

Incidentally, the above embodiment can be realized by using the DSP (Digital Signal Processor) using the digital signal processing technology, which needs no description here, and by using such the technology, the adaptability of the noise reduction processing which is adaptive to the reduction of the circuit structure and the nature of the noise, can be increased.

As described above, according to the eighth aspect of the present invention, the noise reduction apparatus is provided with: a noise detection means for detecting the noise included in a demodulation signal having the information corresponding to audio signals of a plurality of channels from the demodulation signals; an audio signal demodulation means for demodulating and outputting the audio signals corresponding to each of the plurality of channels from the information corresponding to the audio signals of the demodulation signals; and a correction means which can correct independently for each audio signal outputted from the audio signal demodulation means according to the output of the noise detection means, thereby, the influence of the other channel is not exerted in the correction of the signal of one channel, and further, because the detection of the noise is carried out in the demodulation signal, the noise detection can be carried out under the condition that the noise component is not lost.

Further, because the noise detection means is structured such that the noise detection is conducted in such a manner that, for each predetermined period which alternates among a plurality of channels, a portion of the period respectively overlaps with each other, thereby, the noise reduction apparatus by which the more exact noise detection can be conducted, can be realized.

Further, because the noise reduction apparatus is structured such that, according to the output of the noise detection means, a generation condition of the noise is detected, and corresponding to the detected result, the detection sensitivity of the noise detection means is controlled, thereby, the noise reduction apparatus by which the lowering of the audio quality due to the excessive signal correction can be prevented, can be realized.

Further, because the audio output apparatus is structured by including any one of the above noise reduction apparatus, thereby, even when the noise is included, an audio output apparatus by which the audio quality is not lowered, can be obtained.

What is claimed is:

1. A noise reduction apparatus comprising:
   a noise detector detecting a noise included in a demodulated audio signal;
   a first corrector outputting a correction signal for correcting the noise according to a signal value existing just before and just after a predetermined period including a generation time point of the noise in the demodulated audio signal which is detected by said noise detector;
   a second corrector outputting the correction signal for correcting the noise according to at least one of: one or more values of the demodulated audio signal which occur before the generation period of the noise which is detected by said noise detector, and one or more values of the demodulated audio signal which occur after the generation period;
   a high band level detector detecting the level of a high band component of the demodulated audio signal; and
   a selector selecting either one of said first or said second correctors according to the output of said high band level detector.

2. The noise removal apparatus according to claim 1, wherein
   said first corrector outputs a low pass filter output of a signal value obtained from a linear interpolation of two signal values existing just before and just after a predetermined period including a generation time point of the noise, as a correction signal.

3. The noise removal apparatus according to claim 1, wherein
   said second corrector outputs a low pass filter output of the signal value obtained from the linear interpolation of two average signal values obtained by averaging a plurality of signal values existing before and after a predetermined period including the generation time point of the noise, corresponding to each of before and after the generation of the noise, as a correction signal.

4. The noise removal apparatus according to claim 1, further comprising:
   a level detector detecting the whole band level in the demodulated audio signal, wherein
   said selector is operated according to a relationship between a ratio of the level output of said high band level detector to the level output of said level detector, and a predetermined value.

5. The noise removal apparatus according to claim 1, wherein
   the detection sensitivity of said noise detector is changeable corresponding to the output level of said high band level detector.

6. An audio output apparatus comprising said noise removal apparatus according to claim 1.

7. A noise removal apparatus comprising:
   a first demodulator configured to produce a demodulation signal, the demodulation signal having information corresponding to audio signals of a plurality of channels, each of the audio signals corresponding to a respective one of the plurality of channels;
   an audio signal de: modulator configured to receive and demodulate the demodulation signal produced by the first demodulator in order to obtain the audio signals corresponding to each of the plurality of channels from the demodulation signal, the audio signal demodulator further being configured to output the audio signals;
   a noise detector configured to receive the demodulation signal communicated between the first demodulator and the audio signal demodulator, the noise detector further being configured to detect noise in the received demodulation signal;
   a first corrector configured to correct the detected noise in each of the audio signals outputted from the audio signal demodulator according to a first correction technique;
   a second corrector configured to correct the detected noise in each of the audio signals outputted from the audio signal demodulator according to a second correction technique; and
   a selector configured to select one of the first and second correctors to:
   receive the audio signals respectively corresponding to the plurality of channels outputted from the audio signal demodulator, and
   independently correct the detected noise in each of the audio signals outputted from said audio signal demodulator according to the output of said noise detector,
   wherein the first and second correction techniques are different techniques for independently correcting the detected noise in each of the audio signals, the first correction technique being designed to produce a smaller correction error than the second correction technique when the audio signals have a relatively low frequency with respect to a period of the detected noise, the second correction technique being designed to produce a smaller correction error than the first correction technique when the audio signals have a relatively high frequency with respect to the period of the detected noise, and
   wherein the selection by the selector is based on a detected level of a high band component in the audio signals.

8. The noise removal apparatus according to claim 7, wherein
   said noise detector conducts the noise detection such that, for each predetermined period which alternates among a plurality of channels, a portion of the period respectively overlaps with each other.

9. The noise removal apparatus according to claim 7, wherein
   according to the output of said noise detector, a generation condition of the noise is detected, and corresponding to the detected result, the detection sensitivity of said noise detector is controlled.

10. An audio output apparatus including said noise removal apparatus according to claim 7.

11. The noise removal apparatus according to claim 1, wherein said selector includes a low pass filter for extracting a low frequency component of the demodulated audio signal, and wherein the generating period of the noise in the demodulated audio signal which is detected by said noise detection means is corrected by holding the output signal from said low pass filter.

12. A method comprising:

detecting a period in which noise occurs in a demodulated signal;

detecting a level of a high band component of the demodulated signal;

configuring a correction signal for correcting the noise based on the high band component level according to the following:

if the high band component level satisfies a first criteria, applying a first configuration to the correction signal such that the configured correction signal extends from a signal value in the demodulated signal that occurs prior to the detected period, and if the high band component level satisfies a second criteria, applying a second configuration to the correction signal based on a plurality of signal values in the demodulated signal that occur prior to the detected period.

13. The method of claim 12, wherein configuring the correction signal includes:

obtaining a first correction signal that extends from the signal value in the demodulated signal that occurs prior to the detected period;

obtaining a second correction signal based on the plurality of signal values in the demodulated signal that occur prior to the detected period;

selecting one of the first and second correction signals based on whether the high band component level satisfies the first or second criteria.

14. The method of claim 13, further comprising:

determining the signal value in the demodulated signal that occurs prior to the detected period;

determining a signal value in the demodulated signal that occurs subsequent to the detected period;

obtaining the first correction signal by performing a linear interpolation of the signal values in the demodulated signal respectively occurring prior to and subsequent to the detected period.

15. The method of claim 13, further comprising:

averaging the plurality of signal values in the demodulated signal that occur prior to the detection period to obtain a first average value, wherein the second correction signal extends from the first average value.

16. The method of claim 15, further comprising:

averaging a plurality of signal values in the demodulated signals that occur subsequent to the detection period to obtain a second average value; and obtaining the second correction signal by performing a linear interpolation on the first and second average values.

17. The method of claim 13, further comprising:

low pass filtering the plurality of signal values in the demodulated signal that occur before the detected period; and holding a signal level of the low pass filtering to obtain the second correction signal.

18. The method of claim 13, wherein the selecting one of the first and second correction signals includes:

detecting a level of high and low band components of the demodulated signal;

obtaining a ratio of the high band component level to the high and low band components level;

determining whether the high band component level satisfies the first or second criteria based on the ratio, wherein the high band component level satisfies the first criteria if the ratio is less than a predetermined level, and the high band component level satisfies the second criteria if the ratio is larger than the predetermined level.

19. The method of claim 12, further comprising:

changing, based on the high band component level, a sensitivity of noise detection associated with the detecting the period in which noise occurs.

20. The method of claim 19, wherein the sensitivity of noise detection decreases as the high band component level increases.

* * * * *